(12) United States Patent
Jiang

(10) Patent No.: US 10,432,476 B2
(45) Date of Patent: Oct. 1, 2019

(54) METHOD, APPARATUS, AND SYSTEM FOR JOINING NODE TO NETWORK

(71) Applicant: Huawei Technologies Co., Ltd., Shenzhen (CN)

(72) Inventor: Tong Jiang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 19 days.

(21) Appl. No.: 15/694,149

(22) Filed: Sep. 1, 2017

(65) Prior Publication Data

US 2017/0366411 A1    Dec. 21, 2017

Related U.S. Application Data

(63) Continuation of application No. PCT/CN2015/073584, filed on Mar. 3, 2015.

(51) Int. Cl.
*H04L 12/28* (2006.01)
*H04L 12/24* (2006.01)
(Continued)

(52) U.S. Cl.
CPC .......... *H04L 41/12* (2013.01); *H04L 12/2803* (2013.01); *H04L 12/2809* (2013.01);
(Continued)

(58) Field of Classification Search
CPC ....... H04L 12/185; H04L 12/24; H04L 12/28; H04L 29/08; H04L 12/2803;
(Continued)

(56) References Cited

U.S. PATENT DOCUMENTS 8,578,458 B2 * 11/2013 Oksman .................. G06F 21/31
    709/201
2008/0245498 A1    10/2008 Ostendorf et al.
(Continued)

FOREIGN PATENT DOCUMENTS

CN    101237325 A    8/2008
CN    101447901 A    6/2009
(Continued)

OTHER PUBLICATIONS

Oksman et al, G.hn: The New ITU-T Home Networking Standard, IEEE, 8 pages, Oct. 2009.*
(Continued)

*Primary Examiner* — Frank Duong
(74) *Attorney, Agent, or Firm* — Slater Matsil, LLP

(57) ABSTRACT

Embodiments provide a method, an apparatus, and a system for joining a node to a network. The method includes: receiving an access indication that is sent by a joined node and that carries information about at least one joining node; broadcasting, according to the access indication, a MAP frame carrying the information about the at least one joining node, so that a joining node corresponding to the joining node information directly completes registration after receiving the MAP frame; and sending, by a DM, an authentication password to the joining node, so that the joining node completes authentication according to the authentication password and joins the network.

19 Claims, 14 Drawing Sheets

(51) Int. Cl.
*H04L 29/12* (2006.01)
*H04L 29/06* (2006.01)
*H04L 29/08* (2006.01)
*H04L 12/18* (2006.01)

(52) U.S. Cl.
CPC ............ *H04L 61/20* (2013.01); *H04L 63/083* (2013.01); *H04L 69/324* (2013.01); *H04L 12/185* (2013.01); *H04L 61/6022* (2013.01); *H04L 2012/2841* (2013.01); *H04L 2012/2843* (2013.01); *H04L 2012/2845* (2013.01)

(58) Field of Classification Search
CPC ..... H04L 12/2809; H04L 29/06; H04L 29/12; H04L 41/12; H04L 61/20; H04L 61/6022; H04L 63/083; H04L 69/324; H04L 2012/2841; H04L 2012/2843; H04L 2012/2845
See application file for complete search history.

(56) References Cited

U.S. PATENT DOCUMENTS

| | | |
|---|---|---|
| 2009/0092154 A1 | 4/2009 | Malik et al. |
| 2010/0214916 A1 | 8/2010 | Wu et al. |
| 2012/0170625 A1 | 7/2012 | Kim et al. |
| 2012/0324554 A1* | 12/2012 | Gomez Martinez ......................... G06F 21/445 726/6 |
| 2016/0156528 A1* | 6/2016 | Aloush .................. H04B 3/544 709/223 |
| 2017/0063415 A1 | 3/2017 | Kim et al. |
| 2017/0093679 A1* | 3/2017 | Xu .......................... H04L 12/28 |

FOREIGN PATENT DOCUMENTS

| | | |
|---|---|---|
| CN | 102484567 A | 5/2012 |
| CN | 102573002 A | 7/2012 |
| EP | 1357705 A1 | 10/2003 |
| JP | 2005039787 A | 2/2005 |
| JP | 2005045431 A | 2/2005 |
| JP | 2012518954 A | 8/2012 |
| JP | 2014230152 A | 12/2014 |

OTHER PUBLICATIONS

International Telecommunication Union (ITU), "Unified High-Speed Wire-Line Based Home Networking Transceivers-Data Link Layer Specification," Draft revised Recommendation ITU-T G.9961, Study Period 2013-2016, Geneva; CH, vol. 18/15, Mar. 2, 2015, 406 pages.

International Telecommunication Union, Series G: Transmission Systems and Media, Digital Systems and Networks, "Applications of ITU-T G.9960, ITU-T G.9961 Transceivers for Smart Grid Applications: Advanced Metering Infrastructure, Energy Management in the Home and Electric Vehicles," ITU-T Technical Paper (Jun. 2010), 32 pages.

International Telecommunication Union, Series G: Transmission Systems and Media, Digital Systems and Networks, Access Networks—In Premises Networks, "Unified High-Speed Wire-Line Based Home Networking Transceivers-Data Link Layer Specification," Amendment 2, ITU-T G.9961 (Apr. 2014), 44 pages.

ITU-T, "Secure Admission in G.hn Network," Recommendation ITU-T G.9978 (2015), 83 pages.

ITU-T G.9961, Series G: Transmission Systems and Media, Digital Systems and Networks, Access networks—In premises networks, Unified high-speed wire-line based home networking transceivers—Data link layer specification, Jun. 2010, 220 pages.

* cited by examiner

METHOD, APPARATUS, AND SYSTEM FOR JOINING NODE TO NETWORK

CROSS-REFERENCE TO RELATED APPLICATIONS

This application is a continuation of International Application No. PCT/CN2015/073584, filed on Mar. 3, 2015, the disclosure of which is hereby incorporated by reference in its entirety.

TECHNICAL FIELD

The present invention relates to the field of communications technologies, and in particular, to a method, an apparatus, and a system for joining a node to a network.

BACKGROUND

A home network technology is a home information platform that integrates a home control network and a multimedia information network, and can be used to implement interconnection and management of various intelligent household appliance devices, communications devices, information devices, and the like in a home range. With an ever-increasing requirement of home networks for bandwidth, and an increasing demand of users for service diversification, the home network (G.hn) standard approved by the international telecommunication union-telecommunication standardization sector (ITU-T) in 2010 can therefore support transmission media such as a power line, a coaxial cable, and a telephone line, and is a unified home network standard.

A home network based on G.hn may include one or more domains, and a domain is generally a centralized management network. In a domain, there is a domain master controller (DM), that is, a domain master node. In addition to having a communication function of an ordinary node, the DM further needs to be responsible for management of the entire domain, for example, creation of the domain, node registration, bandwidth allocation and resource scheduling of the domain, coordination with multiple adjacent domains or networks, and network power consumption management. For a domain working in a security mode, the domain further includes a security controller (SC). The SC is responsible for authentication of a node in the domain and key management. Registered nodes all need to be authenticated by the SC before obtaining a key to perform secure data transmission.

The DM performs domain management and resource scheduling by periodically broadcasting a media access plan (MAP) frame at a media access control (MAC) layer, where the MAP frame indicates a start time of a next MAC cycle, transmission opportunity allocation for resource scheduling for nodes, and a related parameter needed for domain working. Because there may be hidden nodes in the domain and these nodes cannot directly communicate with the DM, the DM may designate some nodes as MAP relay nodes, and arrange these MAP relay nodes to send a relayed media access plan (RMAP) frame.

In a G.hn-based home network, a joining node joins, in a push-button pairing manner, a domain working in a security mode. The manner includes the following.

First, a pairing button is pushed at a DM in the domain, or a pairing button is pushed at any ordinary node in the domain, and the ordinary node notifies the DM of the pairing button pushed event by using an existing network.

After the pairing button is pushed or the notification of the pairing button pushed event is received, the DM opens a 120-second window for allowing a pairing request, and broadcasts, in each MAC cycle, a MAP frame carrying corresponding indication information.

Within 120 seconds after the pairing button is pushed at the DM or within 120 seconds after the pairing button is pushed at the ordinary node, a pairing button is pushed at a joining node, and after receiving the MAP frame from the domain, the joining node sends a registration request to the DM.

The DM receives the registration request of the joining node, and after determining to accept the joining node, sends, to the joining node, a registration confirmation message indicating that registration succeeds, where the registration confirmation message carries a password needed in a domain authentication process.

After receiving the registration confirmation message, the joining node initiates an authentication procedure to an SC in the domain according to the password in the registration confirmation message and an existing security authentication mechanism, and after authentication succeeds, the joining node may perform data transmission in the domain.

120 seconds after the DM opens the window for allowing a pairing request, the DM closes the window.

Obviously, when a joining node joins a domain in the foregoing manner, pairing buttons need to be separately pushed at any node in the domain and the joining node, and a moment at which the pairing button is pushed at the joining node needs to be within 120 seconds after a moment at which the pairing button is pushed at the any node in the domain; otherwise, the joining node cannot join the domain. Therefore, a misoperation easily occurs, resulting in a network joining failure. In addition, in actual application, a result of joining a secure domain in a push-button pairing manner is quite uncertain, and a network joining success rate is relatively low.

SUMMARY

Embodiments of the present invention provide a method, an apparatus, and a system for joining a node to a network, to resolve a problem in the prior art that a misoperation caused when a node joins a network in a push-button pairing manner results in a failure of joining the network by the node and a relatively low success rate of joining the network by the node.

According to a first aspect, a method for joining a node to a network is provided. The method includes receiving an access indication sent by a joined node, where the access indication includes information about at least one joining node. The method also includes broadcasting a media access plan (MAP) frame according to the access indication, where the MAP frame carries the information about the at least one joining node. The method also includes receiving a registration request that is sent by a first joining node among a joining node corresponding to the information about the at least one joining node, where the registration request is sent by the first joining node when the first joining node determines that the information about the at least one joining node in the MAP frame includes node information of the first joining node. The method also includes sending an authentication password to the first joining node according to the registration request, where the authentication password is used by the first joining node to complete authentication according to the authentication password.

With reference to the first aspect, in a first possible implementation, the joining node information includes a media access control (MAC) address of the joining node and/or a node identifier of the joining node.

With reference to the first aspect or the first possible implementation of the first aspect, in a second possible implementation, the broadcasting, according to the access indication, a MAP frame carrying the information about the at least one joining node includes: obtaining the information about the at least one joining node carried in the access indication; generating a MAP frame including a node auxiliary field, where the node auxiliary field carries the information about the at least one joining node; and broadcasting the generated MAP frame.

With reference to any one of the first aspect or the foregoing possible implementations of the first aspect, in a third possible implementation, the broadcasting a MAP frame carrying the information about the at least one joining node includes: opening a time window for allowing network joining; and broadcasting, at least once in at least one MAC cycle within the time window for allowing network joining, the MAP frame carrying the information about the at least one joining node.

With reference to any one of the first aspect or the foregoing possible implementations of the first aspect, in a fourth possible implementation, the sending an authentication password to the first joining node includes: sending a registration confirmation message to the first joining node, where the confirmation message carries the authentication password.

With reference to the second possible implementation of the first aspect, in a fifth possible implementation, after the broadcasting the generated MAP frame, the method further includes: after first preset duration or at completion of authentication of each joining node corresponding to the joining node information carried in the node auxiliary field of the MAP frame, generating a MAP frame that does not include the node auxiliary field, and broadcasting the MAP frame that does not include the node auxiliary field, where the first duration is a value of duration during which the MAP frame including the node auxiliary field is broadcast.

With reference to the third possible implementation of the first aspect, in a sixth possible implementation, after the opening a time window for allowing network joining, the method further includes: after second preset duration or upon receiving of a stop access indication sent by the joined node, closing the time window for allowing network joining, where the second duration is a value of duration of the time window for allowing network joining.

According to a second aspect, a method for joining a node to a network is provided. The method includes receiving, by a first node, a media access plan (MAP) frame that is sent by a domain master controller (DM) and that carries information about at least one joining node. The method also includes sending a registration request to the DM when the first node determines that the information about the at least one joining node in the MAP frame includes node information of the first node. The method also includes receiving, by the first node, an authentication password that is returned by the DM according to the registration request. The method also includes completing authentication according to the authentication password.

With reference to the second aspect, in a first possible implementation, the receiving, by a first node, a MAP frame that is sent by a DM and that carries information about at least one joining node includes: receiving, by the first node, a MAP frame forwarded by a MAP relay node, where the MAP frame is sent by the DM and carries the information about the at least one joining node.

With reference to the second aspect or the first possible implementation of the second aspect, in a second possible implementation, the joining node information includes a media access control (MAC) address of the joining node and/or a node identifier of the joining node.

With reference to any one of the second aspect or the foregoing possible implementations of the second aspect, in a third possible implementation, the receiving an authentication password returned by the DM includes: receiving a registration confirmation message that is returned by the DM and that carries the authentication password.

According to a third aspect, a method for joining a node to a network is provided. The method includes receiving an access indication sent by a joined node, where the access indication includes information about at least one joining node. The method also includes separately generating corresponding joining node identification information according to the information about the at least one joining node in the access indication, where the joining node identification information is used to identify each corresponding joining node. The method also includes broadcasting a media access plan (MAP) frame carrying the generated joining node identification information. The method also includes receiving a registration request that is sent by a first joining node among a joining node corresponding to the generated joining node identification information, where the registration request is sent by the first joining node when the first joining node determines that the joining node identification information in the MAP frame includes identification information of the first joining node. The method also includes determining that a joining node corresponding to the information about the at least one joining node in the access indication includes the first joining node, and sending an authentication password to the first joining node, where the authentication password is used by the first joining node to complete authentication according to the authentication password.

With reference to the third aspect, in a first possible implementation, the joining node information includes a media access control (MAC) address of the joining node and/or a node identifier of the joining node.

With reference to the first possible implementation of the third aspect, in a second possible implementation, the separately generating corresponding joining node identification information according to the information about the at least one joining node in the access indication includes: when the joining node information includes the MAC address of the joining node, separately determining a value corresponding to each bit position in a MAC address of each joining node, selecting a first quantity of bit positions of all bit positions in the MAC address of each joining node according to a specified rule, and generating corresponding joining node identification information according to values corresponding to the first quantity of bit positions selected in the MAC address of each joining node; or when the joining node information includes the node identifier of the joining node, separately determining a MAC address of a corresponding joining node according to each joining node identifier, separately determining a value corresponding to each bit position in the MAC address of each joining node, selecting a first quantity of bit positions of all bit positions in the MAC address of each joining node according to a specified rule, and generating corresponding joining node identification information according to values corresponding to the first quantity of bit positions selected in the MAC address of each joining node.

With reference to any one of the third aspect or the foregoing possible implementations of the third aspect, in a third possible implementation, the broadcasting a MAP frame carrying the generated joining node identification information includes: generating a MAP frame including a node auxiliary field, where the node auxiliary field carries the generated joining node identification information; and broadcasting the generated MAP frame.

With reference to any one of the third aspect or the foregoing possible implementations of the third aspect, in a fourth possible implementation, the broadcasting a MAP frame carrying the generated joining node identification information includes: opening a time window for allowing network joining; and broadcasting, at least once in at least one MAC cycle within the time window for allowing network joining, the MAP frame carrying the generated joining node identification information.

With reference to any one of the third aspect or the foregoing possible implementations of the third aspect, in a fifth possible implementation, the sending an authentication password to the first joining node includes: sending a registration confirmation message to the first joining node, where the confirmation message carries the authentication password.

With reference to the third possible implementation of the third aspect, in a sixth possible implementation, after the broadcasting the generated MAP frame, the method further includes: after first preset duration or at completion of authentication of each joining node corresponding to the joining node information in the access indication, generating a MAP frame that does not include the node auxiliary field, and broadcasting the MAP frame that does not include the node auxiliary field, where the first duration is a value of duration during which the MAP frame including the node auxiliary field is broadcast.

With reference to the fourth possible implementation of the third aspect, in a seventh possible implementation, after the opening a time window for allowing network joining, the method further includes: after second preset duration or upon receiving of a stop access indication sent by the joined node, closing the time window for allowing network joining, where the second duration is a value of duration of the time window for allowing network joining.

According to a fourth aspect, a method for joining a node to a network is provided. The method includes receiving, by a first node, a media access plan (MAP) frame that is sent by a domain master controller (DM) and that carries identification information of at least one joining node. The method also includes determining, by the first node, identification information used to identify the first node. The method also includes sending a registration request to the DM when determining that the identification information of the at least one joining node in the MAP frame includes the determined identification information used to identify the first node. The method also includes receiving, by the first node, an authentication password that is returned by the DM according to the registration request. The method also includes completing authentication according to the authentication password.

With reference to the fourth aspect, in a first possible implementation, the receiving, by a first node, a media access plan (MAP) frame that is sent by a DM and that carries identification information of at least one joining node includes: receiving, by the first node, a MAP frame forwarded by a MAP relay node, where the MAP frame is sent by the DM and carries the identification information of the at least one joining node.

With reference to the fourth aspect or the first possible implementation of the fourth aspect, in a second possible implementation, the determining, by the first node, identification information used to identify the first node includes: determining, by the first node, a value corresponding to each bit position in a media access control (MAC) address of the first node; selecting a first quantity of bit positions of all bit positions according to a specified rule; and generating, according to values corresponding to the selected first quantity of bit positions, the identification information used to identify the first node.

With reference to any one of the fourth aspect or the foregoing possible implementations of the fourth aspect, in a third possible implementation, the receiving an authentication password returned by the DM includes: receiving a registration confirmation message that is returned by the DM and that carries the authentication password.

According to a fifth aspect, a method for joining a node to a network is provided. The method includes receiving, by a domain master controller (DM), an access indication sent by a joined node, where the access indication is used to instruct to allow a joining node that does not store an authentication password of a domain in which the DM is located to join the network. The method also includes broadcasting, by the DM, a media access plan (MAP) frame according to the access indication, where the MAP frame carries an indication for allowing registration of a node that does not have the authentication password. The method also includes receiving, by the DM, a registration request that is sent by the joining node that does not store the authentication password of the domain in which the DM is located. The method also includes generating, by the DM, a first joining node information set according to joining node information of all joining nodes that have sent a registration request, and sending the first joining node information set to the joined node. The method also includes receiving, by the DM, a second joining node information set that is returned by the joined node according to the first joining node information set, where the second joining node information set is a subset of the first joining node information set. The method also includes sending, by the DM, the authentication password to a joining node corresponding to joining node information in the second joining node information set, where the authentication password is used by the joining node to complete authentication according to the authentication password.

With reference to the fifth aspect, in a first possible implementation, the joining node information includes a media access control (MAC) address of the joining node and/or a node identifier of the joining node.

With reference to the fifth aspect or the first possible implementation of the fifth aspect, in a second possible implementation, the broadcasting, by the DM according to the access indication, a MAP frame carrying an indication for allowing registration of a node that does not have the authentication password includes: generating, by the DM according to the access indication, a MAP frame to which a specified field is added, where the specified field includes the indication for allowing registration of a node that does not have the authentication password, and the indication for allowing registration of a node that does not have the authentication password is used to instruct a joining node that does not store the authentication password of the domain in which the DM is located to send a registration request; and broadcasting the generated MAP frame.

With reference to any one of the fifth aspect or the foregoing possible implementations of the fifth aspect, in a third possible implementation, the broadcasting, by the DM according to the access indication, a MAP frame carrying an indication for allowing registration of a node that does not have the authentication password includes: opening, by the DM, a time window for allowing network joining; and broadcasting, at least once in at least one MAC cycle within the time window for allowing network joining, the MAP frame carrying the indication for allowing registration of a node that does not have the authentication password.

With reference to the second possible implementation of the fifth aspect, in a fourth possible implementation, after the broadcasting the generated MAP frame, the method further includes: after first preset duration, generating a MAP frame to which the specified field is not added, and broadcasting the MAP frame to which the specified field is not added, where the first duration is a value of duration during which the MAP frame to which the specified field is added is broadcast.

With reference to the third possible implementation of the fifth aspect, in a fifth possible implementation, after the opening a time window for allowing network joining, the method further includes: after second preset duration or upon receiving of a stop access indication sent by the joined node, closing the time window for allowing network joining, where the second duration is a value of duration of the time window for allowing network joining.

According to a sixth aspect, a method for joining a node to a network is provided. The method includes sending an access indication to a domain master controller (DM), where the access indication is used to instruct the DM to allow a node that does not store an authentication password of a domain in which the DM is located to join the network. The method also includes receiving a first joining node information set that is sent by the DM and that is generated according to joining node information of all joining nodes that have sent a registration request. The method also includes selecting information about at least one joining node from the joining node information of the first joining node information set, and generating a second joining node information set according to the selected information about the at least one joining node. The method also includes sending the second joining node information set to the DM.

With reference to the sixth aspect, in a first possible implementation, after the sending the second joining node information set to the DM, the method further includes: sending a stop access indication to the DM.

According to a seventh aspect, a method for joining a node to a network is provided. The method includes receiving, by a first node, a media access plan (MAP) frame that is sent by a domain master controller (DM) and that carries an indication for allowing registration of a node that does not have an authentication password. The method also includes sending a registration request to the DM when the first node determines that the first node does not store the authentication password of a domain in which the DM is located. The method also includes receiving, by the first node, the authentication password that is returned by the DM according to the registration request. The method also includes completing authentication according to the authentication password.

With reference to the seventh aspect, in a first possible implementation, the receiving, by a first node, a MAP frame that is sent by a DM and that carries an indication for allowing registration of a node that does not have an authentication password includes: receiving, by the first node, a MAP frame forwarded by a MAP relay node, where the MAP frame is sent by the DM and carries the indication for allowing registration of a node that does not have the authentication password.

According to an eighth aspect, an apparatus for joining a node to a network is provided. The apparatus includes a receiving unit, configured to receive an access indication sent by a joined node, where the access indication includes information about at least one joining node. The apparatus also includes a sending unit, configured to broadcast a media access plan (MAP) frame according to the access indication, where the MAP frame carries the information about the at least one joining node. The receiving unit is further configured to receive a registration request that is sent by a first joining node among a joining node corresponding to the information about the at least one joining node, where the registration request is sent by the first joining node when the first joining node determines that the information about the at least one joining node in the MAP frame includes node information of the first joining node. The sending unit is further configured to send an authentication password to the first joining node, where the authentication password is used by the first joining node to complete authentication according to the authentication password.

With reference to the eighth aspect, in a first possible implementation, the joining node information includes a media access control (MAC) address of the joining node and/or a node identifier of the joining node.

With reference to the eighth aspect or the first possible implementation of the eighth aspect, in a second possible implementation, the sending unit is specifically configured to: obtain the information about the at least one joining node carried in the access indication; generate a MAP frame including a node auxiliary field, where the node auxiliary field carries the information about the at least one joining node; and broadcast the generated MAP frame.

With reference to any one of the eighth aspect or the foregoing possible implementations of the eighth aspect, in a third possible implementation, the sending unit is specifically configured to: open a time window for allowing network joining; and broadcast, at least once in at least one MAC cycle within the time window for allowing network joining, the MAP frame carrying the information about the at least one joining node.

With reference to any one of the eighth aspect or the foregoing possible implementations of the eighth aspect, in a fourth possible implementation, the sending unit is specifically configured to: send a registration confirmation message to the first joining node, where the confirmation message carries the authentication password.

With reference to the second possible implementation of the eighth aspect, in a fifth possible implementation, the sending unit is further configured to: after the generated MAP frame is broadcast, after first preset duration or at completion of authentication of each joining node corresponding to the joining node information carried in the node auxiliary field of the MAP frame, generate a MAP frame that does not include the node auxiliary field, and broadcast the MAP frame that does not include the node auxiliary field, where the first duration is a value of duration during which the MAP frame including the node auxiliary field is broadcast.

With reference to the third possible implementation of the eighth aspect, in a sixth possible implementation, the sending unit is further configured to: after the time window for allowing network joining is opened, after second preset duration or upon receiving of a stop access indication sent by the joined node, close the time window for allowing network joining, where the second duration is a value of duration of the time window for allowing network joining.

According to a ninth aspect, an apparatus for joining a node to a network is provided. The apparatus includes a receiving unit, configured to receive a media access plan (MAP) frame that is sent by a domain master controller (DM) and that carries information about at least one joining node. The apparatus also includes a sending unit, configured to send a registration request to the DM when the information about the at least one joining node in the MAP frame includes node information of the apparatus for joining a node to a network. The receiving unit is further configured to receive an authentication password that is returned by the DM according to the registration request. The apparatus also includes an authentication unit, configured to complete authentication according to the authentication password.

With reference to the ninth aspect, in a first possible implementation, the receiving unit is specifically configured to: receive a MAP frame forwarded by a MAP relay node, where the MAP frame is sent by the DM and carries the information about the at least one joining node.

With reference to the ninth aspect or the first possible implementation of the ninth aspect, in a second possible implementation, the joining node information includes a media access control (MAC) address of the joining node and/or a node identifier of the joining node.

With reference to any one of the ninth aspect or the foregoing possible implementations of the ninth aspect, in a third possible implementation, the receiving unit is specifically configured to: receive a registration confirmation message that is returned by the DM and that carries the authentication password.

According to a tenth aspect, an apparatus for joining a node to a network is provided. The apparatus includes a receiving unit, configured to receive an access indication sent by a joined node, where the access indication includes information about at least one joining node. The apparatus also in a generation unit, configured to separately generate corresponding joining node identification information according to the information about the at least one joining node in the access indication, where the joining node identification information is used to identify each corresponding joining node. The apparatus also includes a sending unit, configured to broadcast a MAP frame carrying the generated joining node identification information. The receiving unit is further configured to receive a registration request that is sent by a first joining node among a joining node corresponding to the generated joining node identification information, where the registration request is sent by the first joining node when the first joining node determines that the joining node identification information in the MAP frame includes identification information of the first joining node. The sending unit is further configured to: determine that a joining node corresponding to the information about the at least one joining node in the access indication includes the first joining node, and send an authentication password to the first joining node, where the authentication password is used by the first joining node to complete authentication according to the authentication password.

With reference to the tenth aspect, in a first possible implementation, the joining node information includes a media access control (MAC) address of the joining node and/or a node identifier of the joining node.

With reference to the first possible implementation of the tenth aspect, in a second possible implementation, when separately generating corresponding joining node identification information according to the information about the at least one joining node in the access indication, the generation unit is specifically configured to: when the joining node information includes the MAC address of the joining node, separately determine a value corresponding to each bit position in a MAC address of each joining node, select a first quantity of bit positions of all bit positions in the MAC address of each joining node according to a specified rule, and generate corresponding joining node identification information according to values corresponding to the first quantity of bit positions selected in the MAC address of each joining node; or when the joining node information includes the node identifier of the joining node, separately determine a MAC address of a corresponding joining node according to each joining node identifier, separately determine a value corresponding to each bit position in the MAC address of each joining node, select a first quantity of bit positions of all bit positions in the MAC address of each joining node according to a specified rule, and generate corresponding joining node identification information according to values corresponding to the first quantity of bit positions selected in the MAC address of each joining node.

With reference to any one of the tenth aspect or the foregoing possible implementations of the tenth aspect, in a third possible implementation, the sending unit is specifically configured to: generate a MAP frame including a node auxiliary field, where the node auxiliary field carries the generated joining node identification information; and broadcast the generated MAP frame.

With reference to any one of the tenth aspect or the foregoing possible implementations of the tenth aspect, in a fourth possible implementation, the sending unit is specifically configured to: open a time window for allowing network joining; and broadcast, at least once in at least one MAC cycle within the time window for allowing network joining, the MAP frame carrying the generated joining node identification information.

With reference to any one of the tenth aspect or the foregoing possible implementations of the tenth aspect, in a fifth possible implementation, when sending the authentication password to the first joining node, the sending unit is specifically configured to: send a registration confirmation message to the first joining node, where the confirmation message carries the authentication password.

With reference to the third possible implementation of the tenth aspect, in a sixth possible implementation, the sending unit is further configured to: after the generated MAP frame is broadcast, after first preset duration or at completion of authentication of each joining node corresponding to the joining node information in the access indication, generate a MAP frame that does not include the node auxiliary field, and broadcast the MAP frame that does not include the node auxiliary field, where the first duration is a value of duration during which the MAP frame including the node auxiliary field is broadcast.

With reference to the fourth possible implementation of the tenth aspect, in a seventh possible implementation, the sending unit is further configured to: after the time window for allowing network joining is opened, after second preset duration or upon receiving of a stop access indication sent by the joined node, close the time window for allowing network joining, where the second duration is a value of duration of the time window for allowing network joining.

According to an eleventh aspect, an apparatus for joining a node to a network is provided. The apparatus includes a receiving unit, configured to receive a media access plan (MAP) frame that is sent by a domain master controller (DM) and that carries identification information of at least one joining node. The apparatus also includes a determining unit, configured to determine identification information used to identify the apparatus for joining a node to a network. The apparatus also includes a sending unit, configured to send a registration request to the DM when the identification information of the at least one joining node in the MAP frame includes the determined identification information used to identify the apparatus for joining a node to a network. The receiving unit is further configured to receive an authentication password that is returned by the DM according to the registration request. The apparatus also includes an authentication unit, configured to complete authentication according to the authentication password.

With reference to the eleventh aspect, in a first possible implementation, the receiving unit is specifically configured to: receive a MAP frame forwarded by a MAP relay node, where the MAP frame is sent by the DM and carries the identification information of the at least one joining node.

With reference to the eleventh aspect or the first possible implementation of the eleventh aspect, in a second possible implementation, the determining unit is specifically configured to: determine a value corresponding to each bit position in a media access control (MAC) address of the apparatus for joining a node to a network; select a first quantity of bit positions of all bit positions according to a specified rule; and generate, according to values corresponding to the selected first quantity of bit positions, the identification information used to identify the apparatus for joining a node to a network.

With reference to any one of the eleventh aspect or the foregoing possible implementations of the eleventh aspect, in a third possible implementation, the receiving unit is specifically configured to: receive a registration confirmation message that is returned by the DM and that carries the authentication password.

According to a twelfth aspect, an apparatus for joining a node to a network is provided. The apparatus also includes a receiving unit, configured to receive an access indication sent by a joined node, where the access indication is used to instruct to allow a node that does not store an authentication password of a domain in which the apparatus for joining a node to a network is located to join the network. The apparatus also includes a sending unit, configured to broadcast a media access plan (MAP) frame according to the access indication, where the MAP frame carries an indication for allowing registration of a node that does not have the authentication password. The receiving unit is further configured to receive a registration request that is sent by the joining node that does not store the authentication password of the domain in which the apparatus for joining a node to a network is located. The sending unit is further configured to: generate a first joining node information set according to joining node information of all joining nodes that have sent a registration request, and send the first joining node information set to the joined node. The receiving unit is further configured to receive a second joining node information set that is returned by the joined node according to the first joining node information set, where the second joining node information set is a subset of the first joining node information set. The sending unit is further configured to send the authentication password to a joining node corresponding to joining node information in the second joining node information set, where the authentication password is used by the joining node to complete authentication according to the authentication password.

With reference to the twelfth aspect, in a first possible implementation, the joining node information includes a media access control (MAC) address of the joining node and/or a node identifier of the joining node.

With reference to the twelfth aspect or the first possible implementation of the twelfth aspect, in a second possible implementation, the sending unit is specifically configured to: generate, according to the access indication, a MAP frame to which a specified field is added, where the specified field includes the indication for allowing registration of a node that does not have the authentication password, and the indication for allowing registration of a node that does not have the authentication password is used to instruct to allow a joining node that does not store the authentication password of the domain in which the apparatus for joining a node to a network is located to send a registration request; and broadcast the generated MAP frame.

With reference to any one of the twelfth aspect or the foregoing possible implementations of the twelfth aspect, in a third possible implementation, the sending unit is configured to: open a time window for allowing network joining; and broadcast, at least once in at least one MAC cycle within the time window for allowing network joining, the MAP frame carrying the indication for allowing registration of a node that does not have the authentication password.

With reference to the second possible implementation of the twelfth aspect, in a fourth possible implementation, the sending unit is further configured to: after the generated MAP frame is broadcast, after first preset duration, generate a MAP frame to which the specified field is not added, and broadcast the MAP frame to which the specified field is not added, where the first duration is a value of duration during which the MAP frame to which the specified field is added is broadcast.

With reference to the third possible implementation of the twelfth aspect, in a fifth possible implementation, the sending unit is further configured to: after the time window for allowing network joining is opened, after second preset duration or upon receiving of a stop access indication sent by the joined node, close the time window for allowing network joining, where the second duration is a value of duration of the time window for allowing network joining.

According to a thirteenth aspect, an apparatus for joining a node to a network is provided. The apparatus includes a sending unit, configured to send an access indication to a domain master controller (DM), where the access indication is used to instruct the DM to allow a node that does not store an authentication password of a domain in which the DM is located to join the network. The apparatus also includes a receiving unit, configured to receive a first joining node information set that is sent by the DM and that is generated according to joining node information of all joining nodes that have sent a registration request. The apparatus also includes a generation unit, configured to: select information about at least one joining node from the joining node information of the first joining node information set, and generate a second joining node information set according to the selected information about the at least one joining node. The sending unit is further configured to send the second joining node information set to the DM.

With reference to the thirteenth aspect, in a first possible implementation, the sending unit is further configured to: after sending the second joining node information set to the DM, send a stop access indication to the DM.

According to a fourteenth aspect, an apparatus for joining a node to a network is provided. The apparatus includes a receiving unit, configured to receive a media access plan (MAP) frame that is sent by a domain master controller (DM) and that carries an indication for allowing registration of a node that does not have an authentication password. The apparatus also includes a sending unit, configured to send a registration request to the DM when the first node does not store the authentication password of a domain in which the DM is located. The receiving unit is further configured to receive the authentication password that is returned by the DM according to the registration request. The apparatus also includes an authentication unit, configured to complete authentication according to the authentication password.

With reference to the fourteenth aspect, in a first possible implementation, the receiving unit is specifically configured to: receive a MAP frame forwarded by a MAP relay node, where the MAP frame is sent by the DM and carries the indication for allowing registration of a node that does not have the authentication password.

According to a fifteenth aspect, a system for joining a node to a network is provided. The system includes a joined node, configured to send an access indication to a domain master controller (DM), where the access indication includes information about at least one joining node. The system also includes the DM, configured to: receive the access indication sent by the joined node, and broadcast a media access plan (MAP) frame according to the access indication, where the MAP frame carries the information about the at least one joining node; and receive a registration request that is sent by a joining node corresponding to the information about the at least one joining node, and send an authentication password to the joining node. The system also includes the joining node, configured to: receive the MAP frame that is sent by the DM and that carries the information about the at least one joining node; send the registration request to the DM when determining that the information about the at least one joining node in the MAP frame includes node information of the joining node; receive the authentication password that is returned by the DM according to the registration request; and complete authentication according to the authentication password.

According to a sixteenth aspect, a system for joining a node to a network is provided. The system includes a joined node, configured to send an access indication to a domain master controller (DM), where the access indication includes information about at least one joining node. The system also includes the DM, configured to: receive the access indication sent by the joined node, and separately generate corresponding joining node identification information according to the information about the at least one joining node in the access indication, where the joining node identification information is used to identify each corresponding joining node; broadcast a media access plan (MAP) frame carrying the generated joining node identification information; receive a registration request that is sent by a joining node corresponding to the generated joining node identification information; and determine that a joining node corresponding to the information about the at least one joining node in the access indication includes the joining node, and send an authentication password to the joining node. The system also includes the joining node, configured to: receive the MAP frame that is sent by the DM and that carries the joining node identification information; determine identification information used to identify the joining node, and send the registration request to the DM when determining that the identification information of the at least one joining node in the MAP frame includes the determined identification information used to identify the joining node; receive the authentication password that is returned by the DM according to the registration request; and complete authentication according to the authentication password.

According to a seventeenth aspect, a system for joining a node to a network is provided. The system includes a joined node, configured to: send an access indication to a domain master controller (DM), where the access indication is used to instruct to allow a joining node that does not store an authentication password of a domain in which the DM is located to join the network; receive a first joining node information set that is sent by the DM and that is generated according to joining node information of all joining nodes that have sent a registration request; select information about at least one joining node from the joining node information of the first joining node information set, and generate a second joining node information set according to the selected information about the at least one joining node; and send the second joining node information set to the DM. The system also includes the DM, configured to: receive the access indication sent by the joined node, and broadcast a media access plan (MAP) frame according to the access indication, where the MAP frame carries an indication for allowing registration of a node that does not have the authentication password; receive a registration request that is sent by a joining node that does not store the authentication password of the domain in which the DM is located; generate the first joining node information set according to the joining node information of all the joining nodes that have sent the registration request, and send the first joining node information set to the joined node; receive the second joining node information set that is returned by the joined node according to the first joining node information set; and send the authentication password to a joining node corresponding to joining node information in the second joining node information set. The system also includes the joining node, configured to: receive the MAP frame that is sent by the DM and that carries the indication for allowing registration of a node that does not have the authentication password; send the registration request to the DM when the joining node does not store the authentication password of the domain in which the DM is located; receive the authentication password that is returned by the DM according to the registration request; and complete authentication according to the authentication password.

In the embodiments of the present invention, an access indication that is sent by a joined node and that carries information about at least one joining node is received, and a MAP frame carrying the information about the at least one joining node is broadcasted according to the access indication, so that a joining node corresponding to the joining node information directly completes registration after receiving the MAP frame, and a DM sends an authentication password to the joining node, so that the joining node completes authentication according to the authentication password and therefore successfully joins the network. In this way, when receiving information about a specified joining node, the DM can allow the specified joining node to complete registration and authentication and therefore successfully join the network. Obviously, the DM can allow multiple joining nodes to join the network at the same time, thereby improving network joining efficiency of the nodes, increasing a network joining success rate, and improving user experience and security.

DETAILED DESCRIPTION OF ILLUSTRATIVE EMBODIMENTS

Figure 1:
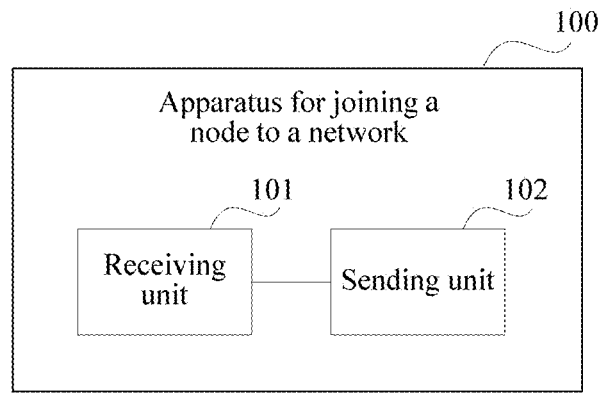
FIG. 1 is a schematic structural diagram of an apparatus, on a DM side, for joining a node to a network according to an embodiment of the present invention.

To make the objectives, technical solutions, and advantages of the present invention clearer, the following further describes the present invention in detail with reference to the accompanying drawings. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

The embodiments of the present invention provide a method, an apparatus, and a system for joining a node to a network, to resolve a problem in the prior art that a misoperation in joining a node to a network in a push-button pairing manner results in a network joining failure and a relatively low network joining success rate. The method and the apparatus are based on a same inventive concept. A problem-resolving principle of the method is similar to that of the apparatus. Therefore, mutual reference may be made between implementation of the apparatus and implementation of the method. A repeated description is not described again.

In the prior art, when a node joins a network in a push-button pairing manner, pairing buttons need to be separately pushed at any node (a DM or an ordinary node) in a current domain and a joining node, and a moment at which the pairing button is pushed at the joining node needs to be within 120 seconds after a moment at which the pairing button is pushed at the any node in the domain; otherwise the joining node cannot join the domain. Therefore, a requirement for an operation of a user is relatively high, and a misoperation easily occurs, resulting in a failure of joining the node to the network and a relatively low success rate of joining the node to the network, thereby compromising user experience. According to the technical solutions in the present invention, an access indication that is sent by a joined node and that carries information about at least one joining node is received, and a MAP frame carrying the information about the at least one joining node is broadcasted according to the access indication, so that a joining node corresponding to the joining node information directly completes registration after receiving the MAP frame; and a DM sends an authentication password to the joining node, so that the joining node completes authentication according to the authentication password and therefore successfully joins the network. In this way, when receiving information about a specified joining node, the DM can allow the specified joining node to complete registration and authentication and therefore successfully join the network. Obviously, the DM can allow multiple joining nodes to join the network at the same time, thereby improving network joining efficiency of the nodes, increasing a network joining success rate, and improving user experience and security.

The embodiments of the present invention provide a method, an apparatus, and a system for joining a node to a network. The system for joining a node to a network is applicable to a G.hn-based home network. The method and the apparatus for joining a node to a network are applicable to intelligent terminal devices in a G.hn-based home network. Preferred implementations of the present invention are described in detail below with reference to the accompanying drawings.

Referring to FIG. 1, an embodiment of the present invention further provides an apparatus 100 for joining a node to a network. The apparatus 100 is applicable to an intelligent terminal device used as a DM in a G.hn-based home network. The apparatus 100 includes: a receiving unit 101 and a sending unit 102.

The receiving unit 101 is configured to receive an access indication sent by a joined node, where the access indication includes information about at least one joining node.

The sending unit 102 is configured to broadcast a MAP frame according to the access indication, where the MAP frame carries the information about the at least one joining node.

The receiving unit 101 is further configured to receive a registration request that is sent by a first joining node among a joining node corresponding to the information about the at least one joining node, where the registration request is sent by the first joining node when the first joining node determines that the information about the at least one joining node in the MAP frame includes node information of the first joining node.

The sending unit 102 is further configured to send an authentication password to the first joining node, where the authentication password is used by the first joining node to complete authentication according to the authentication password.

Optionally, the joining node information includes a media access control (MAC) address of the joining node and/or a node identifier of the joining node.

Optionally, the sending unit 102 is specifically configured to: obtain the information about the at least one joining node carried in the access indication; generate a MAP frame including a node auxiliary field, where the node auxiliary field carries the information about the at least one joining node; and broadcast the generated MAP frame.

Optionally, the sending unit 102 is specifically configured to: open a time window for allowing network joining; and broadcast, at least once in at least one MAC cycle within the time window for allowing network joining, the MAP frame carrying the information about the at least one joining node.

Optionally, the sending unit 102 is specifically configured to: send a registration confirmation message to the first joining node, where the confirmation message carries the authentication password.

Optionally, the sending unit 102 is further configured to: after the generated MAP frame is broadcast, after first preset duration or at completion of each joining node corresponding to the joining node information carried in the node auxiliary field of the MAP frame, generate a MAP frame that does not include the node auxiliary field, and broadcast the MAP frame that does not include the node auxiliary field, where the first duration is a value of duration during which the MAP frame including the node auxiliary field is broadcast.

Optionally, the sending unit 102 is further configured to: after the time window for allowing network joining is opened, after second preset duration or upon receiving of a stop access indication sent by the joined node, close the time window for allowing network joining, where the second duration is a value of duration of the time window for allowing network joining.

Figure 2:
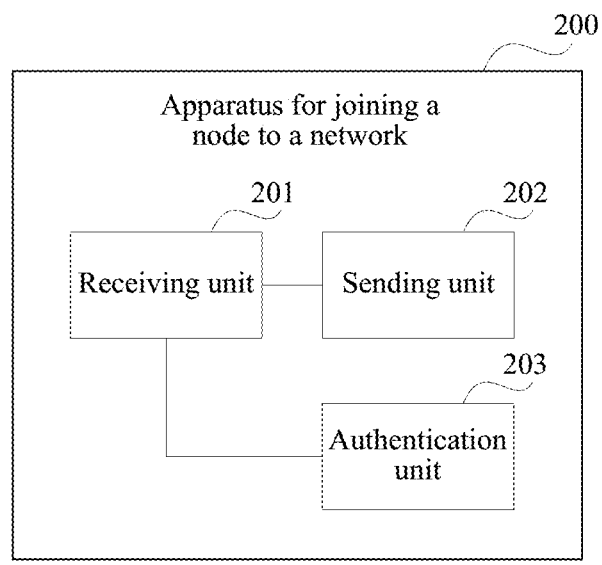
FIG. 2 is a schematic structural diagram of an apparatus, on a joining node side, for joining a node to a network according to an embodiment of the present invention.

Referring to FIG. 2, an embodiment of the present invention further provides an apparatus 200 for joining a node to a network. The apparatus 200 is applicable to an intelligent terminal device that joins a G.hn-based home network and that is used as an ordinary node. The apparatus 200 includes: a receiving unit 201, a sending unit 202, and an authentication unit 203.

The receiving unit 201 is configured to receive a MAP frame that is sent by a domain master controller (DM) and that carries information about at least one joining node.

The sending unit 202 is configured to send a registration request to the DM when the information about the at least one joining node in the MAP frame includes node information of the apparatus for joining a node to a network.

The receiving unit 201 is further configured to receive an authentication password that is returned by the DM according to the registration request.

The authentication unit 203 is configured to complete authentication according to the authentication password.

Optionally, the receiving unit 201 is specifically configured to: receive a MAP frame forwarded by a MAP relay node, where the MAP frame is sent by the DM and carries the information about the at least one joining node.

Optionally, the joining node information includes a media access control (MAC) address of the joining node and/or a node identifier of the joining node.

Optionally, the receiving unit 201 is specifically configured to: receive a registration confirmation message that is returned by the DM and that carries the authentication password.

Figure 3:
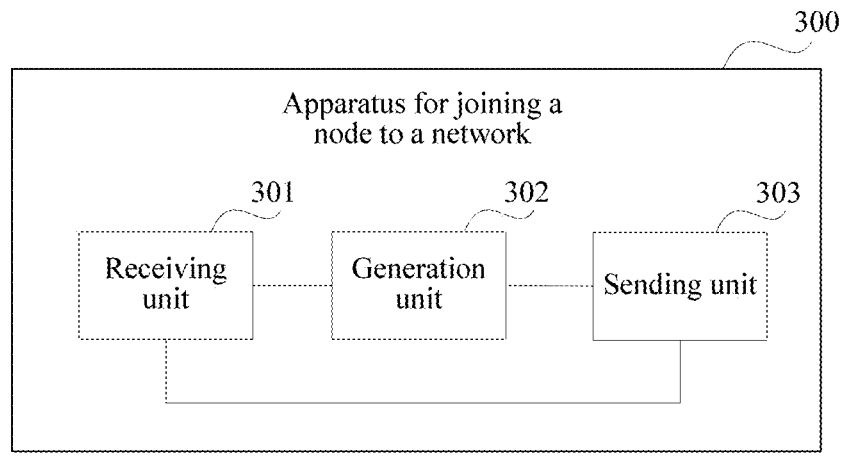
FIG. 3 is a schematic structural diagram of an apparatus, on a DM side, for joining a node to a network according to an embodiment of the present invention.

Referring to FIG. 3, an embodiment of the present invention further provides an apparatus 300 for joining a node to a network. The apparatus 300 is applicable to an intelligent terminal device used as a DM in a G.hn-based home network. The apparatus 300 includes: a receiving unit 301, a generation unit 302, and a sending unit 303.

The receiving unit 301 is configured to receive an access indication sent by a joined node, where the access indication includes information about at least one joining node.

The generation unit 302 is configured to separately generate corresponding joining node identification information according to the information about the at least one joining node in the access indication, where the joining node identification information is used to identify each corresponding joining node.

The sending unit 303 is configured to broadcast a MAP frame carrying the generated joining node identification information.

The receiving unit 301 is further configured to receive a registration request that is sent by a first joining node among a joining node corresponding to the generated joining node identification information, where the registration request is sent by the first joining node when the first joining node determines that the joining node identification information in the MAP frame includes identification information of the first joining node.

The sending unit 303 is further configured to: determine that a joining node corresponding to the information about the at least one joining node in the access indication includes the first joining node, and send an authentication password to the first joining node, where the authentication password is used by the first joining node to complete authentication according to the authentication password.

Optionally, the joining node information includes a media access control (MAC) address of the joining node and/or a node identifier of the joining node.

Optionally, when separately generating corresponding joining node identification information according to the information about the at least one joining node in the access indication, the generation unit 302 is specifically configured to: when the joining node information includes the MAC address of the joining node, separately determine a value corresponding to each bit position in a MAC address of each joining node, select a first quantity of bit positions of all bit positions in the MAC address of each joining node according to a specified rule, and generate corresponding joining node identification information according to values corresponding to the first quantity of bit positions selected in the MAC address of each joining node; or when the joining node information includes the node identifier of the joining node, separately determine a MAC address of a corresponding joining node according to each joining node identifier, separately determine a value corresponding to each bit position in the MAC address of each joining node, select a first quantity of bit positions of all bit positions in the MAC address of each joining node according to a specified rule, and generate corresponding joining node identification information according to values corresponding to the first quantity of bit positions selected in the MAC address of each joining node.

Optionally, the sending unit 303 is specifically configured to: generate a MAP frame including a node auxiliary field, where the node auxiliary field carries the generated joining node identification information; and broadcast the generated MAP frame.

Optionally, the sending unit 303 is specifically configured to: open a time window for allowing network joining; and broadcast, at least once in at least one MAC cycle within the time window for allowing network joining, the MAP frame carrying the generated joining node identification information.

Optionally, when sending an authentication password to the first joining node, the sending unit 303 is specifically configured to: send a registration confirmation message to the first joining node, where the confirmation message carries the authentication password.

The sending unit 303 is further configured to: after the generated MAP frame is broadcast, after first preset duration or at completion of authentication of each joining node corresponding to the joining node information in the access indication, generate a MAP frame that does not include the node auxiliary field, and broadcast the MAP frame that does not include the node auxiliary field, where the first duration is a value of duration during which the MAP frame including the node auxiliary field is broadcast.

The sending unit 303 is further configured to: after the time window for allowing network joining is opened, after second preset duration or upon receiving of a stop access indication sent by the joined node, close the time window for allowing network joining, where the second duration is a value of duration of the time window for allowing network joining.

Figure 4:
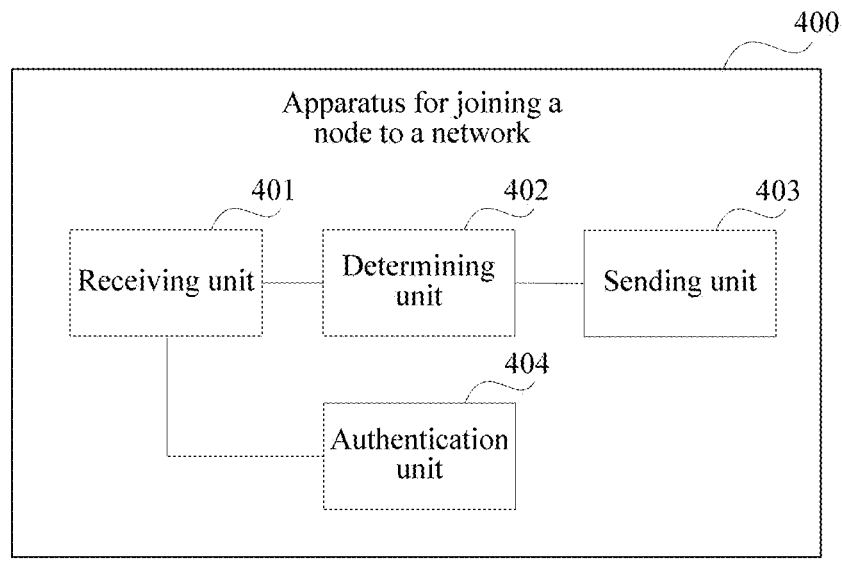
FIG. 4 is a schematic structural diagram of an apparatus, on a joining node side, for joining a node to a network according to an embodiment of the present invention.

Referring to FIG. 4, an embodiment of the present invention further provides an apparatus 400 for joining a node to a network. The apparatus 400 is applicable to an intelligent terminal device that joins a G.hn-based home network and that is used as an ordinary node. The apparatus 400 includes: a receiving unit 401, a determining unit 402, a sending unit 403, and an authentication unit 404.

The receiving unit 401 is configured to receive a media access plan (MAP) frame that is sent by a domain master controller (DM) and that carries identification information of at least one joining node.

The determining unit 402 is configured to determine identification information used to identify the apparatus 400 for joining a node to a network.

The sending unit 403 is configured to send a registration request to the DM when the identification information of the at least one joining node in the MAP frame includes the determined identification information used to identify the apparatus for joining a node to a network.

The receiving unit 401 is further configured to receive an authentication password that is returned by the DM according to the registration request.

The authentication unit 404 is configured to complete authentication according to the authentication password.

Optionally, the receiving unit 401 is specifically configured to: receive a MAP frame forwarded by a MAP relay node, where the MAP frame is sent by the DM and carries the identification information of the at least one joining node.

Optionally, the determining unit 402 is specifically configured to: determine a value corresponding to each bit position in a media access control (MAC) address of the apparatus for joining a node to a network; select a first quantity of bit positions of all bit positions according to a specified rule; and generate, according to values corresponding to the selected first quantity of bit positions, the identification information used to identify the apparatus for joining a node to a network.

Optionally, the receiving unit 401 is specifically configured to: receive a registration confirmation message that is returned by the DM and that carries the authentication password.

Figure 5:
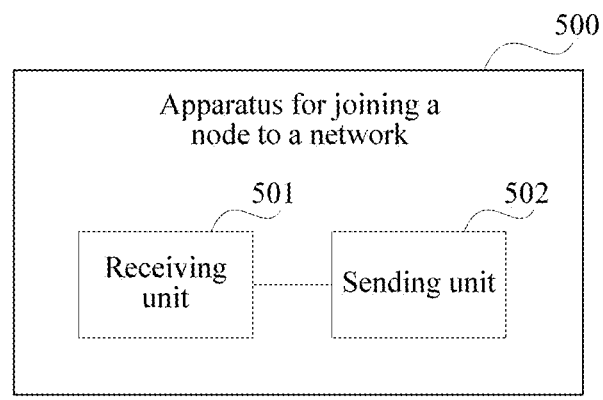
FIG. 5 is a schematic structural diagram of an apparatus, on a DM side, for joining a node to a network according to an embodiment of the present invention.

Referring to FIG. 5, an embodiment of the present invention further provides an apparatus 500 for joining a node to a network. The apparatus 500 is applicable to an intelligent terminal device used as a DM in a G.hn-based home network. The apparatus includes: a receiving unit 501 and a sending unit 502.

The receiving unit 501 is configured to receive an access indication sent by a joined node, where the access indication is used to instruct to allow a node that does not store an authentication password of a domain in which the apparatus for joining a node to a network is located to join the network.

The sending unit 502 is configured to broadcast a media access plan (MAP) frame according to the access indication, where the MAP frame carries an indication for allowing registration of a node that does not have the authentication password.

The receiving unit 501 is further configured to receive a registration request that is sent by the joining node that does not store the authentication password of the domain in which the apparatus for joining a node to a network is located.

The sending unit 502 is further configured to: generate a first joining node information set according to joining node information of all joining nodes that have sent a registration request, and send the first joining node information set to the joined node.

The receiving unit 501 is further configured to receive a second joining node information set that is returned by the joined node according to the first joining node information set, where the second joining node information set is a subset of the first joining node information set.

The sending unit 502 is further configured to send the authentication password to a joining node corresponding to joining node information in the second joining node information set, where the authentication password is used by the joining node to complete authentication according to the authentication password.

Optionally, the joining node information includes a media access control (MAC) address of the joining node and/or a node identifier of the joining node.

Optionally, the sending unit 502 is specifically configured to: generate, according to the access indication, a MAP frame to which a specified field is added, where the specified field includes the indication for allowing registration of a node that does not have the authentication password, and the indication for allowing registration of a node that does not have the authentication password is used to instruct a joining node that does not store the authentication password of the domain in which the apparatus for joining a node to a network is located to send a registration request; and broadcast the generated MAP frame.

Optionally, the sending unit 502 is configured to: open a time window for allowing network joining; and broadcast, at least once in at least one MAC cycle within the time window for allowing network joining, the MAP frame carrying the indication for allowing registration of a node that does not have the authentication password.

Optionally, the sending unit 502 is further configured to: after the generated MAP frame is broadcast, after first preset duration, generate a MAP frame to which the specified field is not added, and broadcast the MAP frame to which the specified field is not added, where the first duration is a value of duration during which the MAP frame to which the specified field is added is broadcast.

Optionally, the sending unit 502 is further configured to: after the time window for allowing network joining is opened, after second preset duration or upon receiving of a stop access indication sent by the joined node, close the time window for allowing network joining, where the second duration is a value of duration of the time window for allowing network joining.

Figure 6:
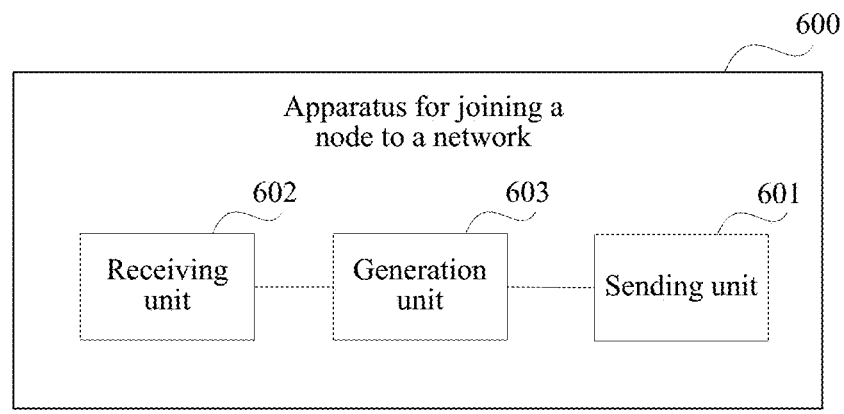
FIG. 6 is a schematic structural diagram of an apparatus, a joined node side, for joining a node to a network according to an embodiment of the present invention.

Referring to FIG. 6, an embodiment of the present invention further provides an apparatus 600 for joining a node to a network. The apparatus 600 is applicable to an intelligent terminal device that joins a G.hn-based home network and that is used as an ordinary node. The apparatus 600 includes: a sending unit 601, a receiving unit 602, and a generation unit 603.

The sending unit 601 is configured to send an access indication to a domain master controller (DM), where the access indication is used to instruct the DM to allow a node that does not store an authentication password of a domain in which the DM is located to join the network.

The receiving unit 602 is configured to receive a first joining node information set that is sent by the DM and that is generated according to joining node information of all joining nodes that have sent a registration request.

The generation unit 603 is configured to: select information about at least one joining node from the joining node information of the first joining node information set, and generate a second joining node information set according to the selected information about the at least one joining node.

The sending unit 601 is further configured to send the second joining node information set to the DM.

Optionally, the sending unit 601 is further configured to: after sending the second joining node information set to the DM, send a stop access indication to the DM.

Figure 7:
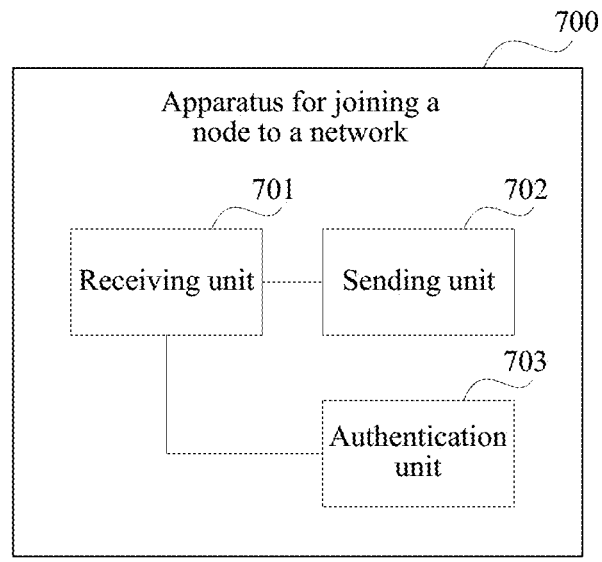
FIG. 7 is a schematic structural diagram of an apparatus, on a joining node side, for joining a node to a network according to an embodiment of the present invention.

Referring to FIG. 7, an embodiment of the present invention further provides an apparatus 700 for joining a node to a network. The apparatus 700 is applicable to an intelligent terminal device that joins a G.hn-based home network and that is used as an ordinary node. The apparatus 700 includes: a receiving unit 701, a sending unit 702, and an authentication unit 703.

The receiving unit 701 is configured to receive a media access plan (MAP) frame that is sent by a domain master controller (DM) and that carries an indication for allowing registration of a node that does not have an authentication password.

The sending unit 702 is configured to send a registration request to the DM when the first node does not store the authentication password of a domain in which the DM is located.

The receiving unit 701 is further configured to receive the authentication password that is returned by the DM according to the registration request.

The authentication unit 703 is configured to complete authentication according to the authentication password.

Optionally, the receiving unit 701 is specifically configured to: receive a MAP frame forwarded by a MAP relay node, where the MAP frame is sent by the DM and carries the indication for allowing registration of a node that does not have the authentication password.

Figure 8:
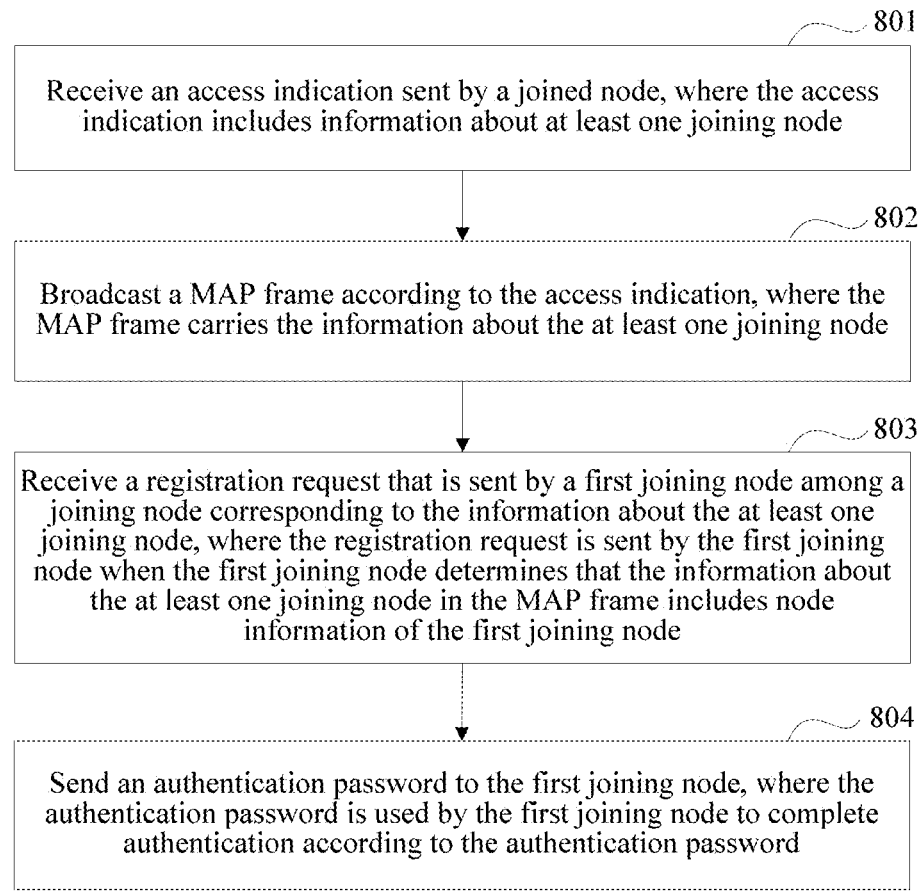
FIG. 8 is a flowchart of a method, on a DM side, for joining a node to a network according to an embodiment of the present invention.

Referring to FIG. 8, an embodiment of the present invention further provides a method for joining a node to a network. The method is applicable to an intelligent terminal device used as a DM in a current domain in a G.hn-based home network. A process of the method includes the following steps.

Step 801: Receive an access indication sent by a joined node, where the access indication includes information about at least one joining node.

The joined node sends the access indication carrying the information about the at least one joining node. Obviously, the joined node has determined the joining node. The joining node determined by the joined node may be specified at the joined node by a user, or may be preset. In short, the joining node is authorized by the user, that is, is an authorized joining node. For example, the joining node may be specified at the joined node by the user. Preferably, the joined node may be an intelligent terminal device that has a screen and in which a G.hn module is built, and the user may select or input the joining node by using the screen, so that the intelligent terminal device having the screen sends the access indication to the DM.

The current domain is a domain working in a security mode. The joining node determined by the joined node may be a node that does not store an authentication password of the current domain and that has joined a domain working in an insecurity mode, or a node in an idle state that has not joined any domain.

Specifically, the access indication includes the information about the at least one joining node. Therefore, the access indication is actually a joining node information set or joining node list information. The joining node information includes a media access control (MAC) address of the joining node and/or a node identifier of the joining node.

Generally, the node identifier of the joining node is obtained according to the MAC address of the joining node. Therefore, the MAC address of the joining node may be obtained according to the node identifier of the joining node.

Optionally, after receiving the access indication sent by the joined node, the DM returns a response message to the joined node.

Step 802: Broadcast a MAP frame according to the access indication, where the MAP frame carries the information about the at least one joining node.

Specifically, the broadcasting, according to the access indication, a MAP frame carrying the information about the at least one joining node includes the following steps: obtaining the information about the at least one joining node carried in the access indication; generating a MAP frame including a node auxiliary field, where the node auxiliary field carries the information about the at least one joining node; and broadcasting the generated MAP frame.

Specifically, the broadcasting a MAP frame carrying the information about the at least one joining node includes: opening a time window for allowing network joining; and broadcasting, at least once in at least one MAC cycle within the time window for allowing network joining, the MAP frame carrying the information about the at least one joining node.

After the DM broadcasts the MAP frame, any node that does not store the authentication password of the current domain receives the MAP frame, and determines whether the joining node information in the MAP frame includes node information of the current node. If the joining node information includes the node information of the current node, it indicates that the node is a joining node corresponding to the joining node information, and the node sends a registration request to the DM; otherwise, it indicates that the node is a node that is not among a joining node corresponding to the joining node information, and the node does not send a registration request. When receiving the MAP frame, a node that stores the authentication password of the current domain also sends a registration request. This solution is a process in the prior art, and details are not described again in the present invention.

Specifically, when the joining node information includes the MAC address of the joining node, when determining whether the joining node information in the MAP frame includes the node information of the current node, the node determines whether MAC addresses included in information about joining nodes include a MAC address of the node.

Similarly, when the joining node information includes the node identifier of the joining node, when determining whether the joining node information in the MAP frame includes the node information of the current node, the node determines whether node identifiers included in information about joining nodes include a node identifier of the node.

Step 803: Receive a registration request that is sent by a first joining node among a joining node corresponding to the information about the at least one joining node, where the registration request is sent by the first joining node when the first joining node determines that the information about the at least one joining node in the MAP frame includes node information of the first joining node.

It can be known from the description of step 802 that, after the DM broadcasts the MAP frame, any node that does not store the authentication password of the current domain receives the MAP frame, and determines whether the joining node information in the MAP frame includes node information of the current node. If the joining node information includes the node information of the current node, it indicates that the node is a joining node corresponding to the joining node information, and the node sends a registration request to the DM.

Step 804: Send an authentication password to the first joining node, where the authentication password is used by the first joining node to complete authentication according to the authentication password.

Optionally, when the authentication password is sent to the first joining node, a registration confirmation message carrying the authentication password may be directly sent to the first joining node.

Optionally, after the broadcasting the generated MAP frame including the node auxiliary field, the method further includes: after first preset duration or at completion of authentication of each joining node corresponding to the joining node information carried in the node auxiliary field of the MAP frame, generating a MAP frame that does not include the node auxiliary field, and broadcasting the MAP frame that does not include the node auxiliary field.

The first duration is a value of duration during which the MAP frame including the node auxiliary field is broadcast. Optionally, the first duration may be 120 seconds, 150 seconds, or the like. The first duration may be set by the user according to actual experience. This is not limited in this embodiment of the present invention.

Optionally, after the opening a time window for allowing network joining, the method further includes: after second preset duration or upon receiving of a stop access indication sent by the joined node, closing the time window for allowing network joining.

The second duration is a value of duration of the time window for allowing network joining. The second duration may be preset by the user.

According to the method for joining a node to a network provided in this embodiment of the present invention, after receiving an access indication that is sent by a joined node and that carries information about at least one joining node, a DM broadcasts, according to the access indication, a MAP frame carrying the information about the at least one joining node, so that a joining node corresponding to the joining node information directly completes registration after receiving the MAP frame; and the DM sends an authentication password to the joining node, so that the joining node completes authentication according to the authentication password and therefore successfully joins the network. In this way, when receiving information about a specified joining node, the DM can allow the specified joining node to complete registration and authentication and therefore successfully join the network. Obviously, the DM can allow multiple joining nodes to join the network at the same time, thereby improving network joining efficiency of the nodes, increasing a network joining success rate, and improving user experience and security.

Figure 9:
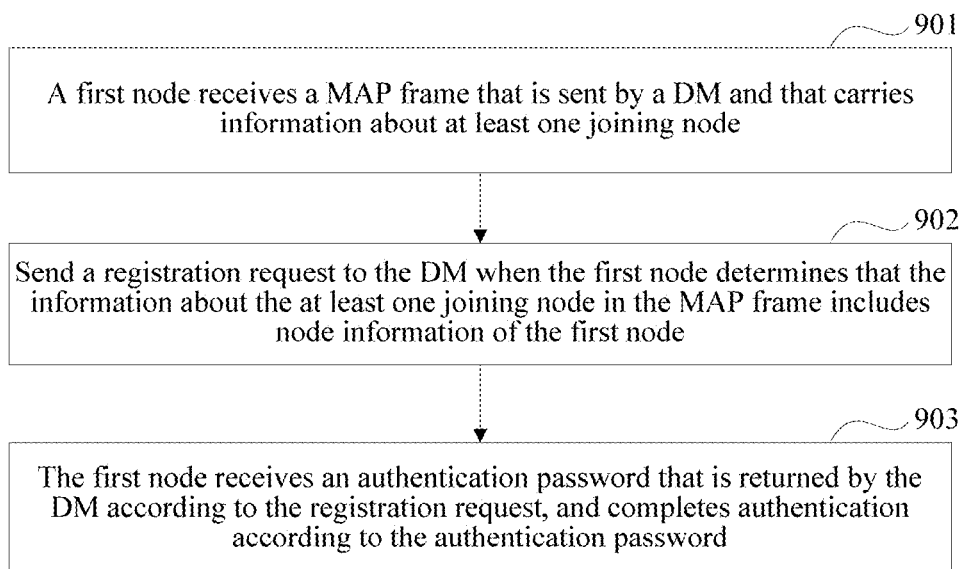
FIG. 9 is a flowchart of a method, on a joining node side, for joining a node to a network according to an embodiment of the present invention.

Based on the foregoing embodiment, referring to FIG. 9, an embodiment of the present invention further provides a method for joining a node to a network. The method is applicable to an intelligent terminal device that joins a G.hn-based home network and that is used as an ordinary node. A process of the method includes the following steps.

Step 901: A first node receives a MAP frame that is sent by a DM and that carries information about at least one joining node.

When the DM broadcasts the MAP frame carrying the information about the at least one joining node, the DM also sends the MAP frame to a MAP relay node, and instructs the MAP relay node to forward the MAP frame, where the forwarded MAP frame is an RMAP frame. If the node is a hidden node, the node receives a MAP frame forwarded by a MAP relay node, that is, receives a MAP frame that is sent by the DM, that is forwarded by a MAP relay node, and that carries the information about the at least one joining node.

The node may be a node that does not store an authentication password of a current domain and that has joined a domain working in an insecurity mode, or a node in an idle state that has not joined any domain.

Step 902: Send a registration request to the DM when the first node determines that the information about the at least one joining node in the MAP frame includes node information of the first node.

Specifically, any node receives the MAP frame. When performing step 902, the node determines whether the joining node information in the MAP frame includes node information of the current node. If the joining node information includes the node information of the current node, it indicates that the node is a joining node corresponding to the joining node information, and the node sends a registration request to the DM; otherwise, it indicates that the node is a node that is not among a joining node corresponding to the joining node information. If the authentication password of the current domain is stored in the node, the node also sends a registration request, and the DM returns a registration confirmation message that does not carry the authentication password to the node. If the authentication password of the current domain is not stored in the node, the node does not send a registration request.

The joining node information includes a MAC address of the joining node and/or a node identifier of the joining node.

Specifically, when the joining node information includes the MAC address of the joining node, when determining whether the joining node information in the MAP frame includes the node information of the current node, the node determines whether MAC addresses included in information about joining nodes include a MAC address of the node.

Similarly, when the joining node information includes the node identifier of the joining node, when determining whether the joining node information in the MAP frame includes the node information of the current node, the node determines whether node identifiers included in information about joining nodes include a node identifier of the node.

Step 903: The first node receives an authentication password that is returned by the DM according to the registration request, and completes authentication according to the authentication password.

Optionally, when step 903 is performed, the method includes: receiving a registration confirmation message that is returned by the DM and that carries the authentication password.

Specifically, after receiving the authentication password sent by the DM, the node performs authentication with an SC in the current domain according to the authentication password. After authentication succeeds, the node joins the current domain, and can perform data transmission.

Figure 10:
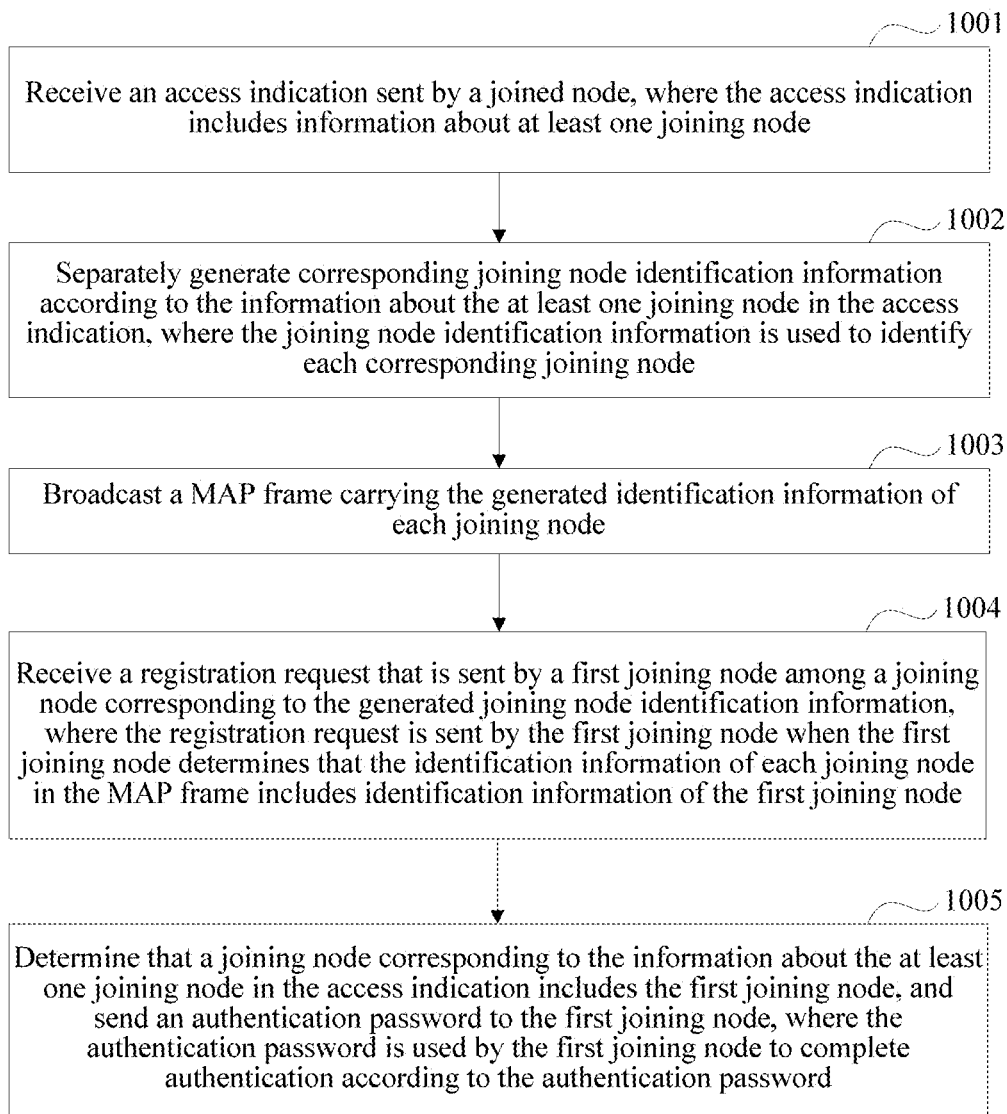
FIG. 10 is a flowchart of a method, on a DM side, for joining a node to a network according to an embodiment of the present invention.

Referring to FIG. 10, an embodiment of the present invention further provides a method for joining a node to a network. The method is applicable to an intelligent terminal device used as a DM in a current domain in a G.hn-based home network. A process of the method includes the following steps.

Step 1001: Receive an access indication sent by a joined node, where the access indication includes information about at least one joining node.

Specifically, the joining node information includes a MAC address of the joining node and/or a node identifier of the joining node.

The joined node sends the access indication carrying the information about the at least one joining node. Obviously, the joined node has determined the joining node. The joining node determined by the joined node may be specified at the joined node by a user, or may be preset. If the joining node may be specified at the joined node by the user, preferably, the joined node may be an intelligent terminal device that has a screen and in which a G.hn module is built, and the user may select or input the joining node by using the screen, so that the intelligent terminal device having a screen sends the access indication to the DM.

The current domain is a domain working in a security mode. The joining node determined by the joined node may be a node that does not store an authentication password of the current domain and that has joined a domain working in an insecurity mode, or a node in an idle state that has not joined any domain.

Specifically, the access indication includes the information about the at least one joining node. Therefore, the access indication is actually a joining node information set or joining node list information. The joining node information includes a MAC address of the joining node and/or a node identifier of the joining node.

Generally, the node identifier of the joining node is obtained according to the MAC address of the joining node. Therefore, the MAC address of the joining node may be obtained according to the node identifier of the joining node.

Optionally, after receiving the access indication sent by the joined node, the DM returns a response message to the joined node.

Step 1002: Separately generate corresponding joining node identification information according to the information about the at least one joining node in the access indication, where the joining node identification information is used to identify each corresponding joining node.

Specifically, the separately generating corresponding joining node identification information according to the information about the at least one joining node in the access indication includes: when the joining node information includes the MAC address of the joining node, separately determining a value corresponding to each bit position in a MAC address of each joining node, selecting a first quantity of bit positions of all bit positions in the MAC address of each joining node according to a specified rule, and generating corresponding joining node identification information according to values corresponding to the first quantity of bit positions selected in the MAC address of each joining node; or when the joining node information includes the node identifier of the joining node, separately determining a MAC address of a corresponding joining node according to each joining node identifier, separately determining a value corresponding to each bit position in the MAC address of each joining node, selecting a first quantity of bit positions of all bit positions in the MAC address of each joining node according to a specified rule, and generating corresponding joining node identification information according to values corresponding to the first quantity of bit positions selected in the MAC address of each joining node.

A value of the first quantity may be 4, 5, 6, or the like. This is not limited in this embodiment of the present invention.

The specified rule is agreed and shared by the DM and the joining node. For example, when the first quantity is 4, the specified rule may be selecting the first four bit positions or the last four bit positions of the bit positions in the MAC address, or selecting a bit position every N bit positions. This is not limited in this embodiment of the present invention.

The joining node identification information is carried in the MAP frame, so that an amount of data carried in the MAP frame can be reduced, and transmission efficiency of the MAP frame can be improved. However, there may be multiple MAC addresses corresponding to identification information of a joining node. For example, a MAC address of the joining node is . . . 0101, and joining node identification information that is generated by selecting values of the last four bit positions in the MAC address is 0101. However, there may be multiple MAC addresses whose last four bit positions are 0101.

Step 1003: Broadcast a MAP frame carrying the generated joining node identification information.

Specifically, when step 1003 is performed, the method may include the following steps: generating a MAP frame including a node auxiliary field, where the node auxiliary field carries the generated joining node identification information; and broadcasting the generated MAP frame.

Specifically, the broadcasting a MAP frame carrying the generated joining node identification information includes: opening a time window for allowing network joining; and broadcasting, at least once in at least one MAC cycle within the time window for allowing network joining, the MAP frame carrying the generated joining node identification information.

After the DM sends, by broadcasting, the MAP frame, any node that does not store the authentication password of the current domain receives the MAP frame, and determines whether the joining node identification information in the MAP frame includes identification information of the current node. If the joining node identification information includes the identification information of the current node, the node sends a registration request to the DM; otherwise, the node does not send a registration request. When receiving the MAP frame, a node that stores the authentication password of the current domain also sends a registration request. This solution is a process in the prior art, and details are not described again in the present invention.

Step 1004: Receive a registration request that is sent by a first joining node among a joining node corresponding to the generated joining node identification information, where the registration request is sent by the first joining node when the first joining node determines that the joining node identification information in the MAP frame includes identification information of the first joining node.

Step 1005: Determine that a joining node corresponding to the information about the at least one joining node in the access indication includes the first joining node, and send an authentication password to the first joining node, where the authentication password is used by the first joining node to complete authentication according to the authentication password.

It is determined that the joining node corresponding to the information about the at least one joining node in the access indication includes the first joining node, that is, the first joining node is an authorized joining node that is determined by the joined node.

It can be known from step 1002 that, there are multiple MAC addresses corresponding to identification information of a joining node, and joining nodes corresponding to the multiple MAC addresses may all send a registration request. Therefore, the DM needs to select a joining node indicated by the access indication from the multiple joining nodes that return a registration request according to the joining node identification information.

Optionally, the sending an authentication password to the first joining node includes: sending a registration confirmation message to the first joining node, where the confirmation message carries the authentication password.

Optionally, after the broadcasting a MAP frame carrying the generated joining node identification information, the method further includes: after first preset duration or at completion of authentication of each joining node corresponding to the joining node information in the access indication, generating a MAP frame that does not include the node auxiliary field, and broadcasting the MAP frame that does not include the node auxiliary field.

The first duration is a value of duration during which the MAP frame including the node auxiliary field is broadcast. Optionally, the first duration may be 120 seconds, 150 seconds, or the like. This is not limited in this embodiment of the present invention.

Optionally, after the opening a time window for allowing network joining, the method further includes: after second preset duration or upon receiving of a stop access indication sent by the joined node, closing the time window for allowing network joining.

The second duration is a value of duration of the time window for allowing network joining.

According to the method for joining a node to a network provided in this embodiment of the present invention, after receiving an access indication that is sent by a joined node and that carries information about at least one joining node, a DM broadcasts, according to the access indication, a MAP frame carrying identification information of the at least one joining node, so that a joining node corresponding to the joining node identification information directly completes registration after receiving the MAP frame; and the DM sends an authentication password to the joining node, so that the joining node completes authentication according to the authentication password and therefore successfully joins the network. In this way, when receiving information about a specified joining node, the DM can allow the specified joining node to complete registration and authentication and therefore successfully join the network. Obviously, the DM can allow multiple joining nodes to join the network at the same time, thereby improving network joining efficiency of the nodes, increasing a network joining success rate, and improving user experience and security.

Figure 11:
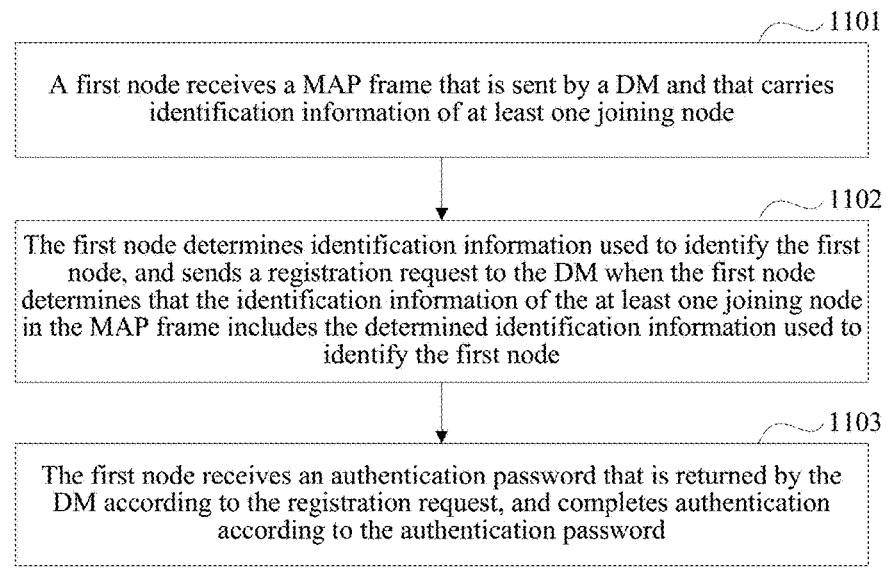
FIG. 11 is a flowchart of a method, on a joining node side, for joining a node to a network according to an embodiment of the present invention.

Based on the foregoing embodiments, referring to FIG. 11, an embodiment of the present invention further provides a method for joining a node to a network. The method is applicable to an intelligent terminal device that joins a G.hn-based home network and that is used as an ordinary node. A process of the method includes the following steps.

Step 1101: A first node receives a MAP frame that is sent by a DM and that carries identification information of at least one joining node.

Specifically, when step 1101 is performed, if the node is a non-hidden node, the node may directly receive the MAP frame sent by the DM; if the node is a hidden node, the node receives a MAP frame that is sent by the DM, that is forwarded by a MAP relay node, and that carries the identification information of the at least one joining node.

The node may be a node that does not store an authentication password of a current domain and that has joined a domain working in an insecurity mode, or a node in an idle state that has not joined any domain.

Step 1102: The first node determines identification information used to identify the first node, and sends a registration request to the DM when the first node determines that the identification information of the at least one joining node in the MAP frame includes the determined identification information used to identify the first node.

Specifically, the determining, by the first node, identification information used to identify the first node includes: determining, by the first node, a value corresponding to each bit position in a MAC address of the first node; selecting a first quantity of bit positions of all bit positions according to a specified rule; and generating, according to values corresponding to the selected first quantity of bit positions, the identification information used to identify the first node.

The specified rule that is used when the identification information of the first node is determined is set through negotiation with the DM. Therefore, the node needs to select a rule that is the same as that selected by the DM.

Specifically, any node receives the MAP frame. When the node performs step 1102, the node determines whether the joining node identification information in the MAP frame includes identification information of the current node, and if the joining node identification information includes the identification information of the current node, the node sends a registration request to the DM; otherwise, if the node stores the authentication password of the current domain, the node also sends a registration request, and the DM returns a registration confirmation message that does not carry the authentication password to the node. If the node does not store the authentication password of the current domain, the node does not send a registration request.

Step 1103: The first node receives an authentication password that is returned by the DM according to the registration request, and completes authentication according to the authentication password.

The receiving an authentication password returned by the DM includes: receiving a registration confirmation message that is returned by the DM and that carries the authentication password.

After receiving the authentication password sent by the DM, the node performs authentication with an SC in the current domain according to the authentication password. After authentication succeeds, the node joins the current domain, and can perform data transmission.

Figure 12:
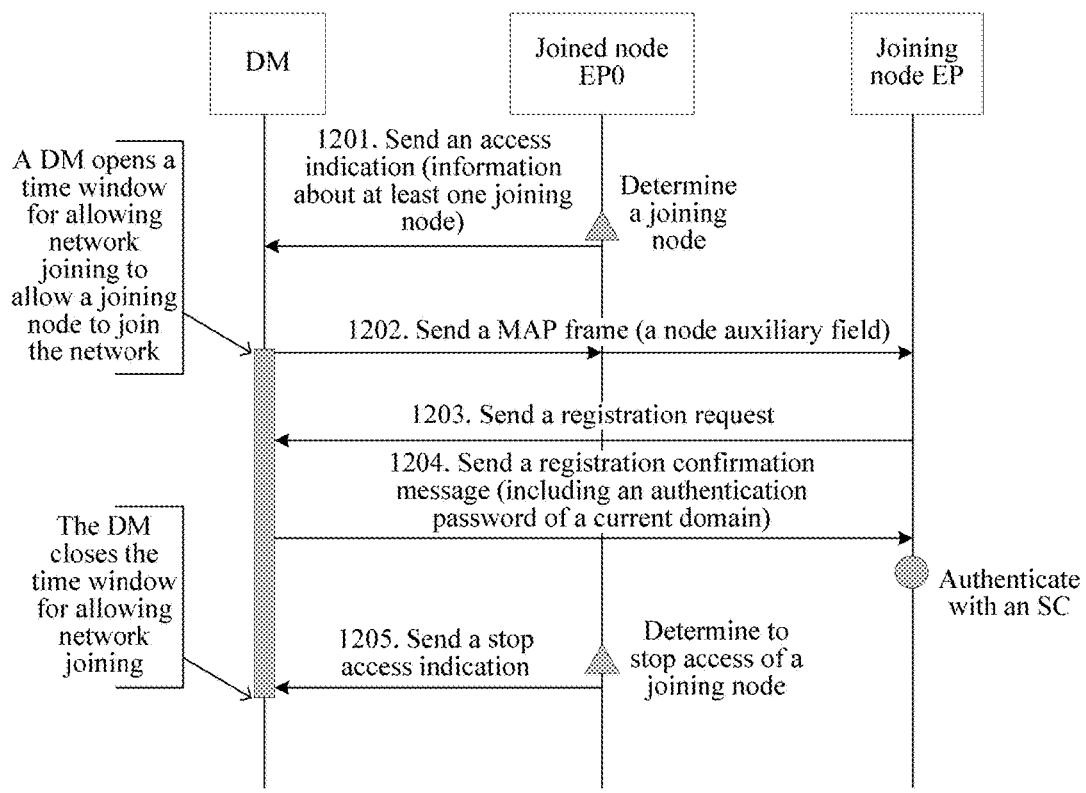
FIG. 12 is a specific flowchart of a method for joining a node to a network according to an embodiment of the present invention.

Based on the foregoing embodiments, referring to FIG. 12, an embodiment of the present invention further provides a method for joining a node to a network. A specific process of the method includes the following steps.

Step 1201: A joined node EPo sends an access indication to a DM of a current domain, where the access indication carries information about at least one joining node.

Specifically, the joined node EPo first needs to determine an authorized joining node. Specifically, the joined node EPo may be an intelligent terminal device that has a screen and in which a G.hn module is built, and a user may select or input the joining node information by using the screen (a user interface), so that the intelligent terminal device having the screen sends the access indication to the DM.

The current domain to which the joined node EPo belongs works in a security mode. Preferably, the joined node EPo may be an intelligent terminal device that has a screen and in which a G.hn module is built.

When the joined node EPo is an intelligent terminal device having a screen, the joined node EPo may determine the joining node in the following two manners:

The joined node EPo may display a list of nodes that do not belong to the current domain. The list of nodes that do not belong to the current domain may be input by the user by using the screen (the user interface) of the joined node EPo, or may be detected by the joined node EPo. This is not limited in this embodiment of the present invention. The user selects, in the list of nodes that do not belong to the current domain that is displayed by the joined node EPo, at least one node as the authorized joining node.

The user directly inputs the joining node on the screen (the user interface) of the joined node EPo.

After determining the joining node, the joined node EPo sends an information set of the selected joining node to the DM of the current domain, where the joining node information set includes the information about the at least one joining node, that is, the access indication.

A message format of the joining node information set is shown in Table 1, where an REGID is generally a MAC address of the node.

TABLE 1

Message format of the joining node information set

| Field | Byte number | Bit | Description |
|---|---|---|---|
| REGID_1 | 0 to 5 | [47:0] | MAC address of the first joining node |
| ... | Variable | | |
| REGID_N | Variable | [47:0] | MAC address of the $N^{th}$ joining node |

Step 1202: After receiving the access indication that is sent by the joined node EPo and that carries the information about the at least one joining node, the DM of the current domain opens a time window for allowing network joining to allow a joining node to join the network, and sends, by broadcasting, a MAP frame including a node auxiliary field at least once in each MAC cycle within the time window for allowing network joining.

Optionally, after receiving the access indication that is sent by the joined node EPo and that carries the information about the at least one joining node, the DM sends a corresponding response message to the joined node EPo.

The MAP frame carrying the information about the at least one joining node is a MAP frame that is generated by the DM and that includes a node auxiliary field, where the node auxiliary field carries the information about the at least one joining node, or carries joining node identification information that is generated according to a MAC address.

Specifically, a format of the node auxiliary field is shown in Table 2 or Table 3.

TABLE 2

Format of the node auxiliary field

| Field | Byte number | Bit | Description |
|---|---|---|---|
| REGID_1 | 0 to 5 | [47:0] | MAC address of the first joining node |
| ... | Variable | | |
| REGID_N | Variable | [47:0] | MAC address of the $N^{th}$ joining node |

TABLE 3

Format of the node auxiliary field

| Field | Description |
|---|---|
| NodeID_1 | Identification information of the first joining node |
| ... | |
| NodeID_N | Identification information of the $N^{th}$ joining node |

The joining node identification information NodeID in the node auxiliary field may be obtained by using a MAC address of a corresponding joining node. For example, the $6^{th}$ bit, the $12^{th}$ bit, and the $18^{th}$ bit, and so on, to the $48^{th}$ bit may be extracted from a 48-bit MAC address of a node every six bits from the $6^{th}$ bit, to form identification information with a length of eight bits, or the last eight bits of the MAC address may be selected, to form a node identifier with a length of eight bits, or the $3^{rd}$ bit, the $6^{th}$ bit, and the $9^{th}$ bit, and so on, to the $48^{th}$ bit may be extracted every three bits from the $3^{rd}$ bit, to form a node identifier with a length of sixteen bits. This is not limited herein.

Step 1203: After receiving the MAP frame sent by the DM, a node EP determines whether the joining node information in the MAP frame includes node information of the current node. If the joining node information includes the node information of the current node, it indicates that the node is an authorized joining node, and the node EP sends a registration request to the DM. Alternatively, the node EP determines whether the joining node identification information in the MAP frame includes identification information of the current node. If the joining node identification information includes the identification information of the current node, the node EP sends a registration request to the DM.

Optionally, before the node EP receives the MAP frame sent by the DM, the user needs to perform a push-button operation at the node EP, to trigger the node EP to receive the MAP frame from the DM, and perform network joining registration and authorization.

The determining by the node EP whether the joining node information in the MAP frame includes the node information of the current node may be determining whether the joining node information includes a REGID of the current node EP.

Step 1204: The DM receives the registration request sent by the joining node EP, determines whether the joining node EP sending the registration request is included in the joining node information in the access indication, and if the joining node EP is included in the joining node information, sends a registration confirmation message and an authentication password of the current domain to the joining node EP. Optionally, the authentication password of the current domain may be included in the registration confirmation message by the DM. If the joining node EP is not included in the joining node information, the DM sends a registration confirmation message to the joining node EP, but cannot send the authentication password of the current domain.

After receiving the authentication password of the current domain, the joining node EP may perform authentication with an SC of the current domain according to the authentication password.

Step 1205: After confirming that network joining of the joining node is stopped, the joined node EPo sends a stop access indication to the DM, to instruct the DM to close the time window for allowing network joining.

That network joining of the joining node is stopped may be confirmed by the joined node EPo according to a stop indication input by the user by using the screen of the joined node EPo.

After the DM closes the time window for allowing network joining, the DM sends, by broadcasting, an ordinary MAP frame in each MAC cycle.

Figure 13:
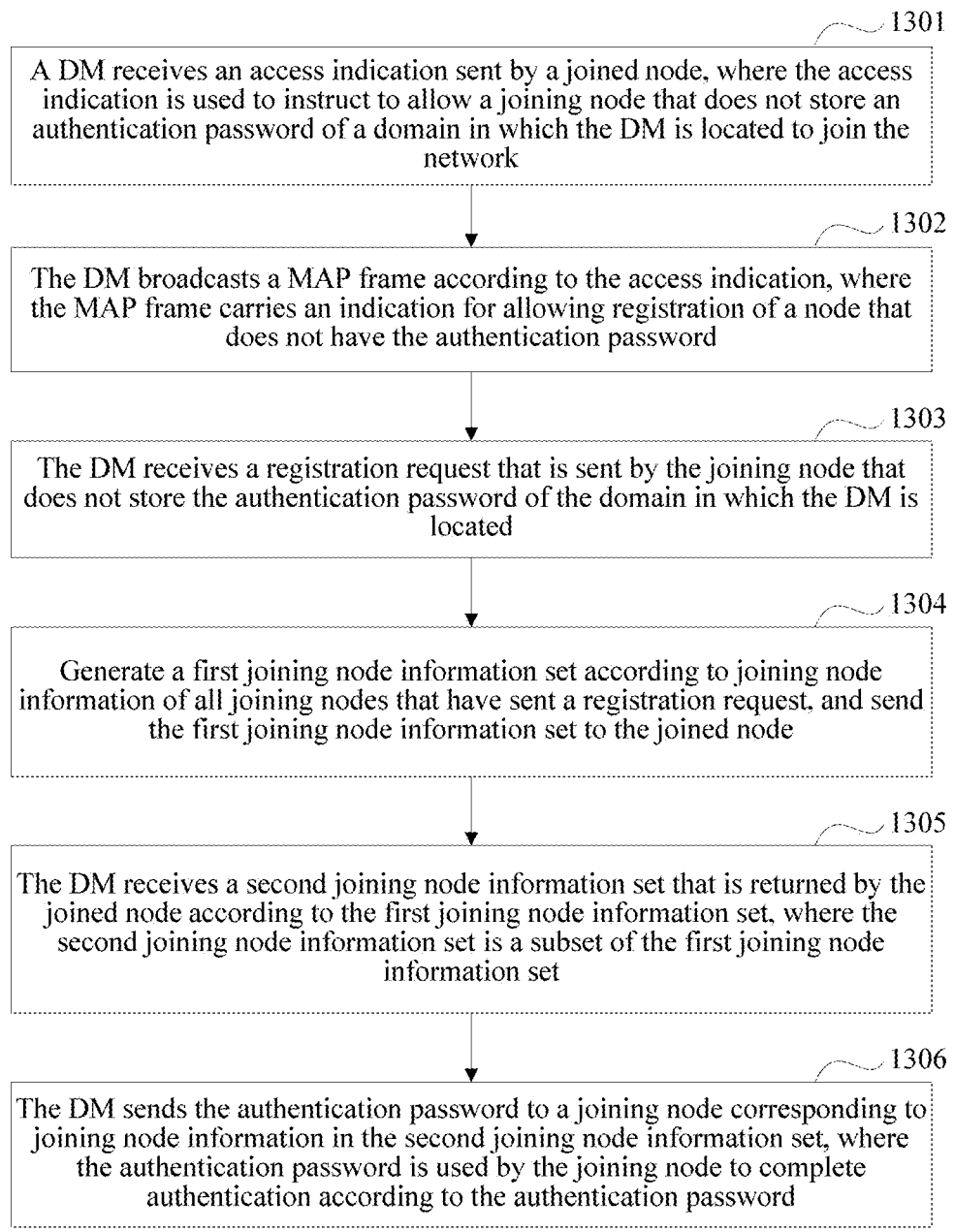
FIG. 13 is a flowchart of a method, on a DM side, for joining a node to a network according to an embodiment of the present invention.

Referring to FIG. 13, an embodiment of the present invention provides a method for joining a node to a network. The method is applicable to an intelligent terminal device used as a DM in a current domain in a G.hn-based home network. A process of the method includes the following steps.

Step 1301: The DM receives an access indication sent by a joined node, where the access indication is used to instruct to allow a joining node that does not store an authentication password of a domain in which the DM is located to join the network.

After receiving the access indication sent by the joined node, optionally, the DM may send a response message to the joined node.

Optionally, a user may start to add a new node to the current domain by setting the joined node, and the joined node sends the access indication to the DM of the current domain.

Preferably, the joined node may be an intelligent terminal device that has a screen and in which a G.hn module is built, and the user may start to add a new node to the current domain by using the screen, so that the intelligent terminal device having the screen sends the access indication to the DM.

The node that does not store the authentication password of the current domain is a node that has never joined the current domain, where the node may be a node that has joined a domain working in an insecurity mode, or a node in an idle state that has not joined any domain.

Step 1302: The DM broadcasts a MAP frame according to the access indication, where the MAP frame carries an indication for allowing registration of a node that does not have the authentication password.

Specifically, the broadcasting, according to the access indication, a MAP frame carrying an indication for allowing registration of a node that does not have the authentication password includes: generating, according to the access indication, a MAP frame to which a specified field is added, where the specified field includes the indication for allowing registration of a node that does not have the authentication password, and the indication for allowing registration of a node that does not have the authentication password is used to instruct to allow a joining node that does not store the authentication password of the current domain to send a registration request; and broadcasting the generated MAP frame.

For example, a specified field, for example, one bit or two bits, is added to a frame header of an existing MAP frame, where the specified field includes the indication for allowing registration of a node that does not have the authentication password. After receiving the MAP frame, a node first performs registration according to the indication for allowing registration of a node that does not have the authentication password that is carried in the MAP frame, but does not perform authentication temporarily.

Optionally, the sending a MAP frame carrying an indication for allowing registration of a node that does not have the authentication password includes: opening a time window for allowing network joining; and broadcasting, at least once in at least one MAC cycle within the time window for allowing network joining, the MAP frame carrying the indication for allowing registration of a node that does not have the authentication password.

After the DM sends, by broadcasting, the MAP frame, any node receives the MAP frame, and determines whether the authentication password of the current domain is not stored in the node locally. If the authentication password of the current domain is not stored in the node locally, the node is a joining node, and the node sends a registration request to the DM. If the authentication password of the current domain is stored in the node locally, it indicates that the node is not a joining node, but the node may directly complete registration, and may be authenticated and join the network without requiring the DM to send the authentication password.

Step 1303: The DM receives a registration request that is sent by the joining node that does not store the authentication password of the domain in which the DM is located.

Optionally, the DM receives the registration request that is sent by the current joining node that does not store the authentication password of the current domain, and sends a registration confirmation message to the joining node, thereby completing registration of the joining node.

Generally, within a time window for allowing network joining, the DM may perform registration of multiple joining nodes, thereby improving registration efficiency of the joining nodes.

Step 1304: Generate a first joining node information set according to joining node information of all joining nodes that have sent a registration request, and send the first joining node information set to the joined node.

In the description in step 1303, the DM receives the registration request sent by the current joining node that does not store the authentication password of the current domain, and sends the registration confirmation message to the joining node, thereby completing registration of the joining node. Therefore, when step 1304 is performed, the first joining node information set may also be generated according to the joining node to which the registration confirmation message has been sent.

Information about any joining node includes a MAC address of the joining node and/or a node identifier of the joining node.

The first joining node information set is sent to the joined node, allowing the user to select one or more joining nodes from information about multiple joining nodes at the joined node, for registration and network joining, thereby improving user experience and security.

Step 1305: The DM receives a second joining node information set that is returned by the joined node according to the first joining node information set, where the second joining node information set is a subset of the first joining node information set.

Optionally, after receiving the second joining node information set, the DM may send a corresponding response message to the joined node.

Step 1306: The DM sends the authentication password to a joining node corresponding to joining node information in the second joining node information set, where the authentication password is used by the joining node to complete authentication according to the authentication password.

After receiving the authentication password sent by the DM, the joining node performs authentication with an SC in the current domain according to the authentication password. After authentication succeeds, the node joins the current domain, and can perform data transmission.

Optionally, after the broadcasting the generated MAP frame to which the specified field is added, the method further includes: after first preset duration, generating a MAP frame to which the specified field is not added, and broadcasting the MAP frame to which the specified field is not added, where the first duration is a value of duration during which the MAP frame to which the specified field is added is broadcast.

Optionally, after the opening a time window for allowing network joining, the method further includes: after second preset duration or upon receiving of a stop access indication sent by the joined node, closing the time window for allowing network joining, where the second duration is a value of duration of the time window for allowing network joining.

According to the method for joining a node to a network provided in this embodiment of the present invention, after receiving an access indication, a DM first registers all joining nodes that do not store a password of a current domain, and then sends a list of registered joining nodes to a joined node for a user to select, and after the user determines an authorized joining node, authentication is performed on the joining node. In this way, when receiving information about a specified joining node, the DM can allow the specified joining node to complete authentication and therefore successfully join the network. Obviously, the DM can allow multiple joining nodes to join the network at the same time, thereby improving network joining efficiency of the nodes, increasing a network joining success rate, and improving user experience and security.

Figure 14:
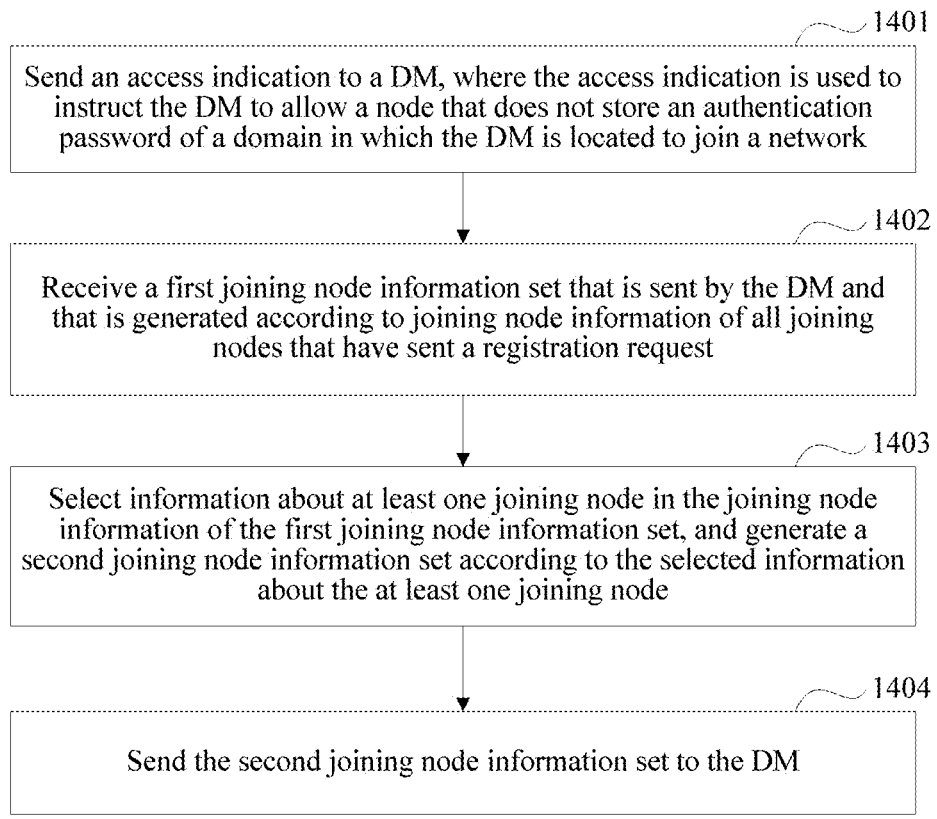
FIG. 14 is a flowchart of a method, on a joined node side, for joining a node to a network according to an embodiment of the present invention.

Based on the foregoing embodiments, referring to FIG. 14, an embodiment of the present invention further provides a method for joining a node to a network. The method is applicable to an intelligent terminal device that has joined a G.hn-based home network and that is used as an ordinary node. A process of the method includes the following steps.

Step 1401: Send an access indication to a DM, where the access indication is used to instruct the DM to allow a node that does not store an authentication password of a domain in which the DM is located to join the network.

Optionally, the sending the access indication to the DM by a joined node may be that a user start to add a new node to a current domain by setting the joined node, and the joined node sends the access indication to the DM of the current domain.

Preferably, the joined node may be an intelligent terminal device that has a screen and in which a G.hn module is built, and the user may start to add a new node to the current domain by using the screen, so that the intelligent terminal device having the screen sends the access indication to the DM.

Step 1402: Receive a first joining node information set that is sent by the DM and that is generated according to joining node information of all joining nodes that have sent a registration request.

After multiple joining nodes all complete registration, a joining node information set is sent to the joined node, so that the user can select one or more joining nodes from information about the multiple joining nodes by using the joined node, thereby improving user experience and security.

Step 1403: Select information about at least one joining node in the joining node information of the first joining node information set, and generate a second joining node information set according to the selected information about the at least one joining node.

Step 1404: Send the second joining node information set to the DM.

Optionally, after the sending the joining node information set to the DM, the method further includes: sending a stop access indication to the DM.

In this way, the user can conveniently control network joining of a new node in the current domain.

Figure 15:
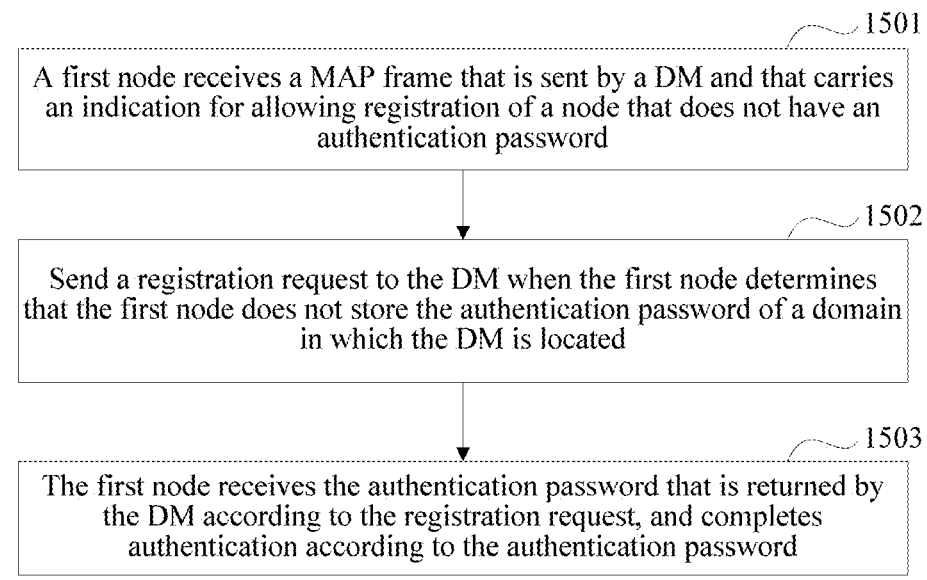
FIG. 15 is a flowchart of a method, on a joining node side, for joining a node to a network according to an embodiment of the present invention.

Based on the foregoing embodiments, referring to FIG. 15, an embodiment of the present invention further provides a method for joining a node to a network. The method is applicable to an intelligent terminal device that joins a G.hn-based home network and that is used as an ordinary node. A process of the method includes the following steps.

Step 1501: A first node receives a MAP frame that is sent by a DM and that carries an indication for allowing registration of a node that does not have an authentication password.

Step 1502: Send a registration request to the DM when the first node determines that the first node does not store the authentication password of a domain in which the DM is located.

The node that does not store the authentication password of the current domain is a node that has never joined the current domain or a node that has joined the current domain but the authentication password has been cleared, where the node may be a node that has joined a domain working in an insecurity mode, or a node in an idle state that has not joined any domain.

Any node receives the MAP frame, and determines whether the node locally stores the authentication password of the current domain. If the node does not store the authentication password of the current domain, the node is a joining node, and the node sends a registration request to the DM. If the node stores the authentication password of the current domain, it indicates that the node is not a joining node, but the node may directly complete registration, and may be authenticated and join the network without requiring the DM to send the authentication password.

Step 1503: The first node receives the authentication password that is returned by the DM according to the registration request, and completes authentication according to the authentication password.

Specifically, after receiving the registration request, the DM further sends a registration confirmation message before sending the authentication password, to notify the node that registration has been completed.

The DM sends the authentication password to the node, indicating that the node is a joining node that is indicated by the user and that needs to join the network. After receiving the authentication password sent by the DM, the joining node performs authentication with an SC in the current domain according to the authentication password. After authentication succeeds, the node joins the current domain, and can perform data transmission.

Figure 16:
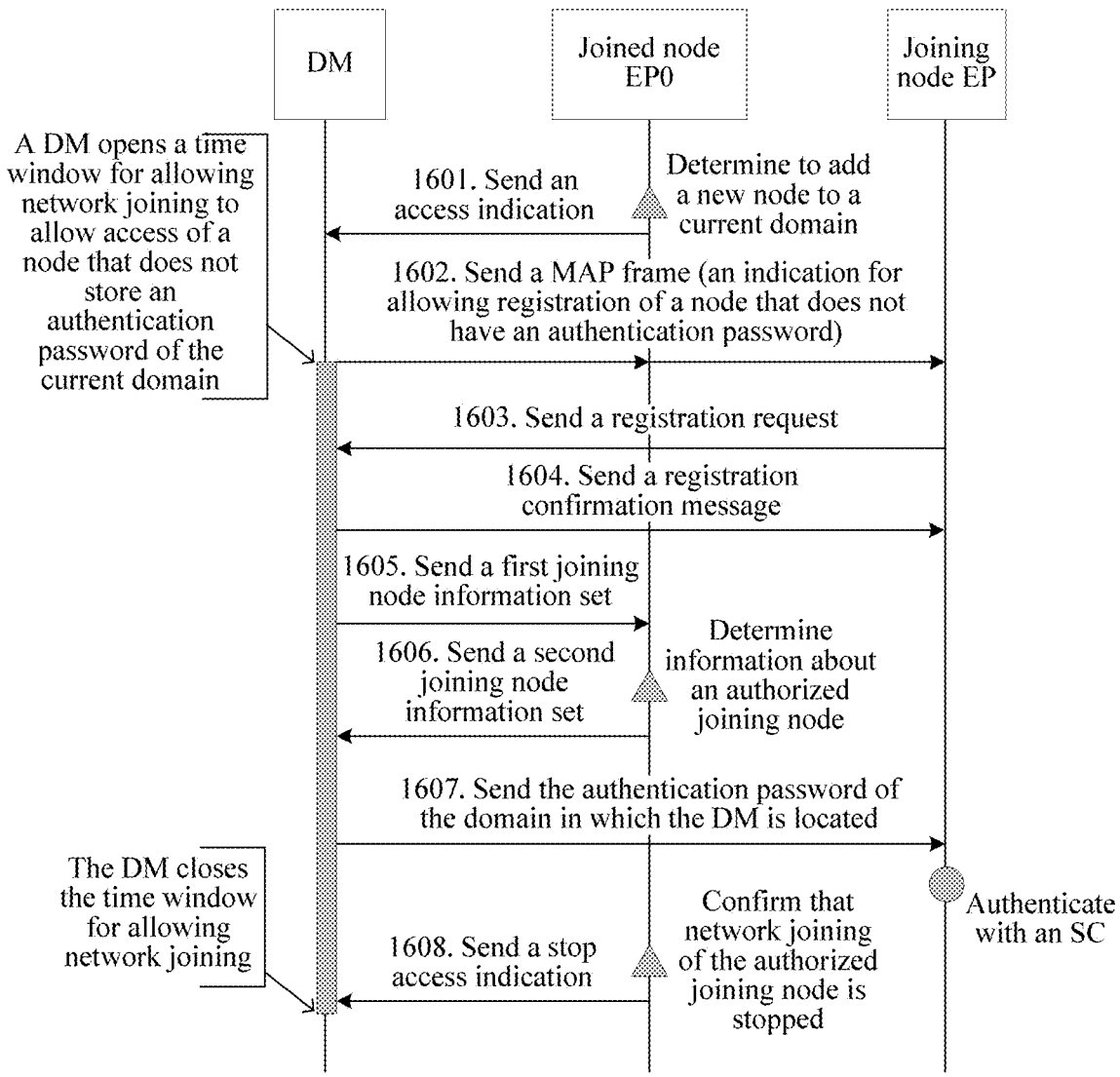
FIG. 16 is a specific flowchart of a method for joining a node to a network according to an embodiment of the present invention.

Based on the foregoing embodiments, referring to FIG. 16, an embodiment of the present invention further provides a method for joining a node to a network. A specific process of the method includes the following steps.

Step 1601: After determining to add a new node to a current domain, a joined node EPo sends an access indication to a DM of the current domain, where the access indication is used to instruct to allow a node that does not store an authentication password of the current domain to join the network.

The joined node EPo first needs to determine to add a new node to the current domain. Specifically, the joined node EPo is an intelligent terminal device that has a screen and in which a G.hn module is built, and a user may select or input an add node indication by using the screen (a user interface), so that the intelligent terminal device having the screen sends the access indication to the DM.

The current domain to which the joined node EPo belongs is a domain in a security mode.

Specifically, a format of the access indication is shown in Table 4.

TABLE 4

Format of the access indication

| Field | Byte number | Bit | Description |
| --- | --- | --- | --- |
| Quantity of attempts | 0 | [1:0] | $00_2$ represents the first attempt $01_2$ represents the second attempt $10_2$, $11_2$-reserved |
| Reserved field | | [7:2] | Reserved field |

Step 1602: After receiving the access indication sent by the joined node EPo, the DM of the current domain opens a time window for allowing network joining, to allow to add a node that does not store an authentication password of the current domain, and sends, by broadcasting, at least once in each MAC cycle within the time window for allowing network joining, a MAP frame carrying an indication for allowing registration of a node that does not have the authentication password.

Specifically, based on an existing MAP frame, a specified field may be added to a MAP frame header of the MAP frame carrying an indication for allowing registration of a node that does not have the authentication password, and the indication for allowing registration of a node that does not have the authentication password is included in the specified field, to instruct to allow a joining node that does not store the authentication password of the current domain to send a registration request.

Step 1603: After receiving the MAP frame, a joining node EP determines whether the joining node EP stores the authentication password of the current domain, and when determining that the joining node EP does not store the authentication password, the joining node EP sends a registration request to the DM.

Optionally, before the joining node EP receives the MAP frame sent by the DM, the user needs to perform a push-button operation at the joining node EP, to trigger the joining node EP to receive the MAP frame from the DM, and perform network joining registration and authentication.

According to an existing solution, when determining that the authentication password of the current domain is stored, the node may directly complete registration, and may be authenticated and join the network without requiring the DM to send the authentication password. Details are not described again in this embodiment of the present invention.

Optionally, the registration request indicates that the joining node EP does not have the authentication password of the current domain, and is a node that only registers but does not perform authentication temporarily.

Step 1604: The DM receives the registration request of the joining node EP, and sends a registration confirmation message. Registration of the joining node EP is complete.

In step 1601 to step 1604, the DM can implement registration of multiple joining nodes. One joining node is only used as an example in this embodiment.

Step 1605: The DM generates a first joining node information set according to all registered joining nodes, and sends the first joining node information set to the joined node EPo.

After a set is generated according to joining node information of all authenticated joining nodes and is sent to the joined node EPo, multiple authenticated joining nodes can be displayed at the joined node EPo for the user to select.

Specifically, the first joining node information set is a message of a list of registered nodes. A format of the message is shown in Table 5.

TABLE 5

Joining node information set

| Field | Byte number | Bit | Description |
| --- | --- | --- | --- |
| REGID_1 | 0 to 5 | [47:0] | MAC address of the first node |
| Device_ID_1 | 6 | [7:0] | Device ID of the first node |
| ... | Variable | | |
| REGID_N | Variable | [47:0] | MAC address of the $N^{th}$ node |
| Device_ID_N | Variable | [7:0] | Device ID of the $N^{th}$ node |

Step 1606: The joined node EPo returns a second joining node information set according to the first joining node information set, where the second joining node information set includes information about at least one joining node.

Before performing step 1606, the joined node EPo displays the received first joining node information set on the screen for the user to select. After the user selects information about at least one authorized joining node from the joining node information set, the joined node EPo instructs the DM to send the authentication password to a joining node corresponding to the information about the authorized joining node.

Specifically, the second joining node information set is a message of a list of authorized nodes. A format of the message is shown in Table 5, and is not described herein again.

Step 1607: The DM receives the second joining node information set, and sends the authentication password of the domain in which the DM is located to a joining node corresponding to information about each joining node in the second joining node information set.

Optionally, after receiving the second joining node information set, the DM sends a corresponding response message to the joined node EPo.

After receiving the authentication password sent by the DM, the joining node performs authentication with an SC in the current domain according to the authentication password. After authentication succeeds, the node joins the current domain, and can perform data transmission.

Step 1608: After confirming that network joining of an authorized joining node is stopped, the joined node EPo sends a stop access indication to the DM, to instruct the DM to close the time window for allowing network joining.

That network joining of the joining node is stopped may be confirmed by the joined node EPo according to an indication that is input by the user by using the screen of the joined node EPo and that instructs to stop allowing a node that does not store the authentication password to join the network.

After the DM closes the time window for allowing network joining, the DM sends, by broadcasting, an ordinary MAP frame in each MAC cycle.

Figure 17:
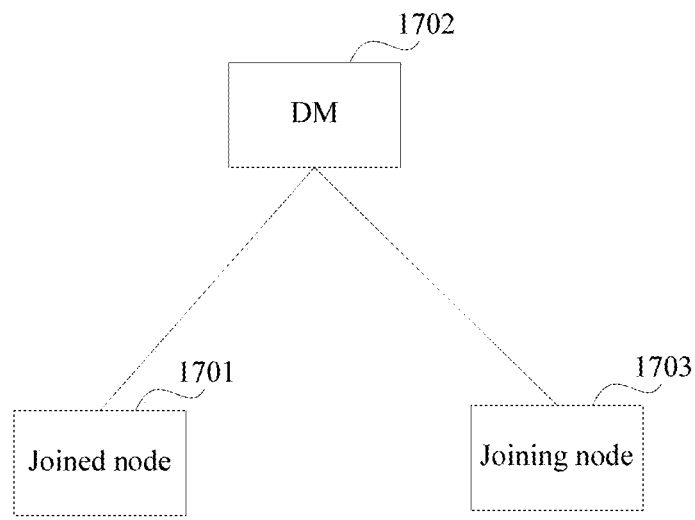
FIG. 17 is a schematic structural diagram of a system for joining a node to a network according to an embodiment of the present invention.

Based on the foregoing embodiments, referring to FIG. 17, an embodiment of the present invention further provides a system for joining a node to a network. The system includes: a joined node 1701, a DM 1702, and a joining node 1703.

The joined node 1701 is configured to send an access indication to the DM 1702, where the access indication includes information about at least one joining node.

The DM 1702 is configured to: receive the access indication sent by the joined node 1701, and broadcast a media access plan (MAP) frame according to the access indication, where the MAP frame carries the information about the at least one joining node; and receive a registration request that is sent by the joining node 1703 corresponding to the information about the at least one joining node, and send an authentication password to the joining node 1703.

The joining node 1703 is configured to: receive the MAP frame that is sent by the DM 1702 and that carries the information about the at least one joining node; send the registration request to the DM 1702 when determining that the information about the at least one joining node in the MAP frame includes node information of the joining node 1703; receive the authentication password that is returned by the DM 1702 according to the registration request; and complete authentication according to the authentication password.

Figure 18:
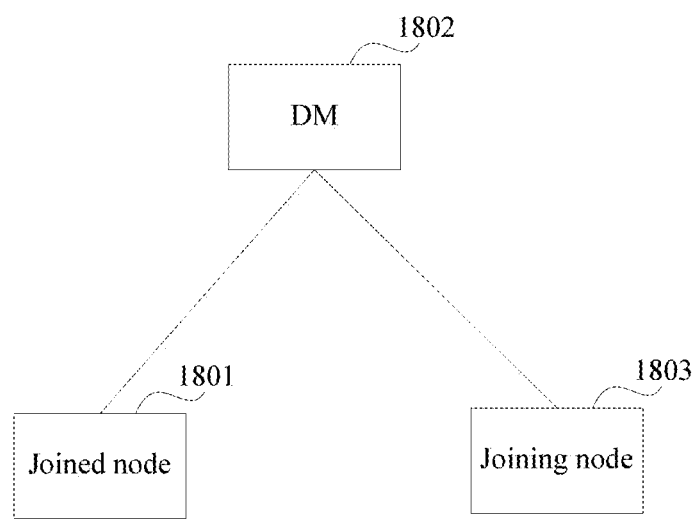
FIG. 18 is a schematic structural diagram of a system for joining a node to a network according to an embodiment of the present invention.

Based on the foregoing embodiments, referring to FIG. 18, an embodiment of the present invention further provides a system for joining a node to a network. The system includes: a joined node 1801, a DM 1802, and a joining node 1803.

The joined node 1801 is configured to send an access indication to the DM 1802, where the access indication includes information about at least one joining node.

The DM 1802 is configured to: receive the access indication sent by the joined node 1801, and separately generate corresponding joining node identification information according to the information about the at least one joining node in the access indication, where the joining node identification information is used to identify each corresponding joining node 1803; broadcast a media access plan (MAP) frame carrying the generated joining node identification information; receive a registration request that is sent by the joining node 1803 corresponding to the generated joining node identification information; and determine that a joining node corresponding to the information about the at least one joining node in the access indication includes the joining node 1803, and send an authentication password to the joining node 1803.

The joining node 1803 is configured to: receive the MAP frame that is sent by the DM 1802 and that carries the joining node identification information; determine identification information used to identify the joining node, and send the registration request to the DM 1802 when the identification information of the at least one joining node in the MAP frame includes the determined identification information used to identify the joining node; receive the authentication password that is returned by the DM 1802 according to the registration request; and complete authentication according to the authentication password.

Figure 19:
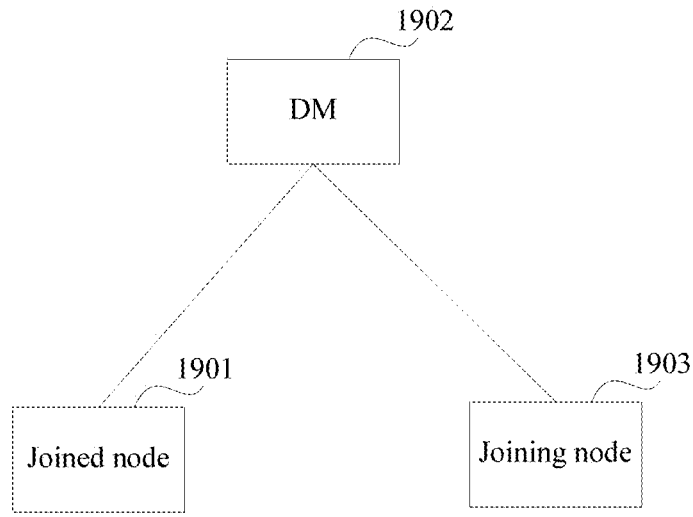
FIG. 19 is a schematic structural diagram of a system for joining a node to a network according to an embodiment of the present invention.

Based on the foregoing embodiments, referring to FIG. 19, an embodiment of the present invention further provides a system for joining a node to a network. The system includes: a joined node 1901, a DM 1902, and a joining node 1903.

The joined node 1901 is configured to: send an access indication to the DM 1902, where the access indication is used to instruct to allow a joining node that does not store an authentication password of a domain in which the DM 1902 is located to join the network; receive a first joining node information set that is sent by the DM 1902 and that is generated according to joining node information of all joining nodes that have sent a registration request; select information about at least one joining node from the joining node information of the first joining node information set, and generate a second joining node information set according to the selected information about the at least one joining node; and send the second joining node information set to the DM 1902.

The DM 1902 is configured to: receive the access indication sent by the joined node 1901, and broadcast a media access plan (MAP) frame according to the access indication, where the MAP frame carries an indication for allowing registration of a node that does not have the authentication password; receive a registration request that is sent by a joining node that does not store the authentication password of the domain in which the DM 1902 is located; generate the first joining node information set according to the joining node information of all the joining nodes that have sent the registration request, and send the first joining node information set to the joined node 1901; receive the second joining node information set that is returned by the joined node 1901 according to the first joining node information set; and send the authentication password to a joining node 1903 corresponding to joining node information in the second joining node information set.

The joining node 1903 is configured to: receive the MAP frame that is sent by the DM 1902 and that carries the indication for allowing registration of a node that does not have the authentication password; send the registration request to the DM 1902 when the joining node 1903 does not store the authentication password of the domain in which the DM 1902 is located; receive the authentication password that is returned by the DM 1902 according to the registration request; and complete authentication according to the authentication password.

Figure 20:
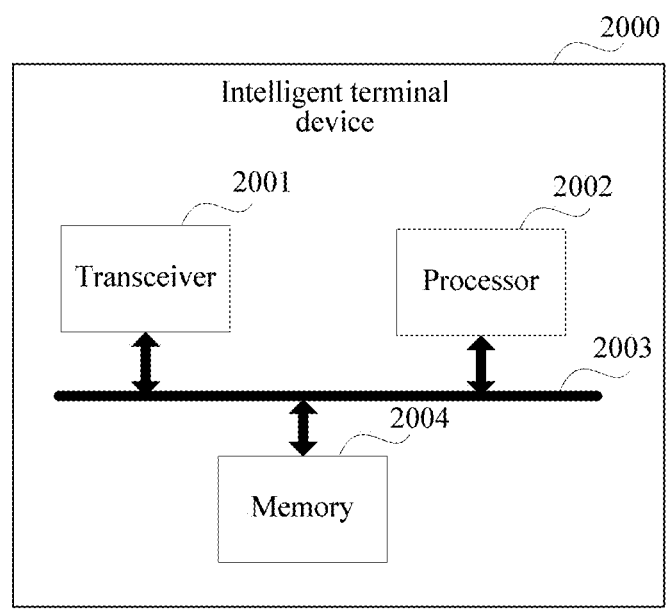
FIG. 20 is a schematic diagram of an intelligent terminal device according to an embodiment of the present invention.

Based on the foregoing embodiments, the present invention further provides an intelligent terminal device 2000. The intelligent terminal device is a DM. Referring to FIG. 20, the intelligent terminal device 2000 includes: a transceiver 2001, a processor 2002, a bus 2003, and a memory 2004.

The transceiver 2001, the processor 2002, and the memory 2004 are connected to each other by means of the bus 2003. The bus 2003 may be a peripheral component interconnect (PCI) bus, an extended industry standard architecture (EISA) bus, or the like. The bus may be classified into an address bus, a data bus, a control bus, or the like. For ease of representation, the bus 2003 is represented in FIG. 20 by using only one bold line, but it does not indicate that there is only one bus or only one type of bus.

The transceiver 2001 is configured to communicate with a joined node and a joining node, for example, receiving an access indication sent by the joined node, broadcasting a MAP frame, receiving a registration request sent by the joining node, and sending an authentication password to the joining node.

The processor 2002 is configured to implement the method for joining a node to a network shown in FIG. 8 in the embodiment of the present invention, and the method includes: receiving an access indication sent by a joined node, where the access indication includes information about at least one joining node; broadcasting a media access plan (MAP) frame according to the access indication, where the MAP frame carries the information about the at least one joining node; receiving a registration request that is sent by a first joining node among a joining node corresponding to the information about the at least one joining node, where the registration request is sent by the first joining node when the first joining node determines that the information about the at least one joining node in the MAP frame includes node information of the first joining node; and sending an authentication password to the first joining node according to the registration request, where the authentication password is used by the first joining node to complete authentication according to the authentication password.

Optionally, the joining node information includes a media access control (MAC) address of the joining node and/or a node identifier of the joining node.

Optionally, the broadcasting, according to the access indication, a MAP frame carrying the information about the at least one joining node includes: obtaining the information about the at least one joining node carried in the access indication; generating a MAP frame including a node auxiliary field, where the node auxiliary field carries the information about the at least one joining node; and broadcasting the generated MAP frame.

Optionally, the broadcasting a MAP frame carrying the information about the at least one joining node includes: opening a time window for allowing network joining; and broadcasting, at least once in at least one MAC cycle within the time window for allowing network joining, the MAP frame carrying the information about the at least one joining node.

Optionally, the sending an authentication password to the first joining node includes: sending a registration confirmation message to the first joining node, where the confirmation message carries the authentication password.

Optionally, after the broadcasting the generated MAP frame, the method further includes: after first preset duration or at completion of authentication of each joining node corresponding to the joining node information carried in the node auxiliary field of the MAP frame, generating a MAP frame that does not include the node auxiliary field, and broadcasting the MAP frame that does not include the node auxiliary field, where the first duration is a value of duration during which the MAP frame including the node auxiliary field is broadcast.

Optionally, after the opening a time window for allowing network joining, the method further includes: after second preset duration or upon receiving of a stop access indication sent by the joined node, closing the time window for allowing network joining, where the second duration is a value of duration of the time window for allowing network joining.

The intelligent terminal device 2000 further includes the memory 2004, configured to store a program and the like. Specifically, the program may include program code, where the program code includes a computer operation instruction. The memory 2004 may include a random access memory (RAM), or may further include a non-volatile memory, such as at least one disk memory. The processor 2002 executes the application program stored in the memory 2004, to implement the foregoing method for joining a node to a network.

Figure 21:
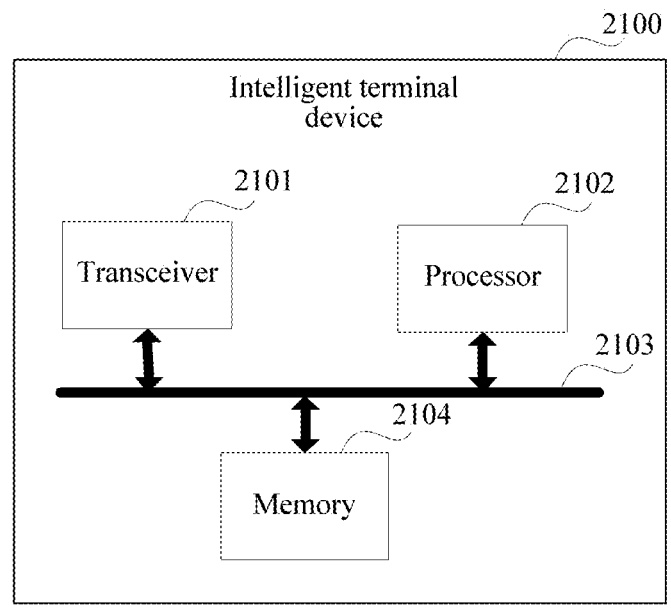
FIG. 21 is a schematic diagram of an intelligent terminal device according to an embodiment of the present invention.

Based on the foregoing embodiments, the present invention further provides an intelligent terminal device 2100. The intelligent terminal device is a joining node. Referring to FIG. 21, the intelligent terminal device 2100 includes: a transceiver 2101, a processor 2102, a bus 2103, and a memory 2104.

The transceiver 2101, the processor 2102, and the memory 2104 are connected to each other by using the bus 2103. The bus 2103 may be a peripheral component interconnect (PCI) bus, an extended industry standard architecture (EISA) bus, or the like. The bus may be classified into an address bus, a data bus, a control bus, or the like. For ease of representation, the bus 2103 is represented in FIG. 21 by using only one bold line, but it does not indicate that there is only one bus or only one type of bus.

The transceiver 2101 is configured to communicate with a DM, for example, receiving a MAP frame sent by the DM, sending a registration request to the DM, and receiving an authentication password returned by the DM.

The processor 2102 is configured to implement the method for joining a node to a network shown in FIG. 9 in the embodiment of the present invention, and the method includes: receiving a media access plan (MAP) frame that is sent by a DM and that carries information about at least one joining node; sending a registration request to the DM when determining that the information about the at least one joining node in the MAP frame includes node information of the intelligent terminal device 2100; receiving an authentication password that is returned by the DM according to the registration request; and completing authentication according to the authentication password.

Optionally, the receiving a MAP frame that is sent by a DM and that carries information about at least one joining node includes: receiving a MAP frame forwarded by a MAP relay node, where the MAP frame is sent by the DM and carries the information about the at least one joining node.

Optionally, the joining node information includes a media access control (MAC) address of the joining node and/or a node identifier of the joining node.

Optionally, the receiving an authentication password returned by the DM includes: receiving a registration confirmation message that is returned by the DM and that carries the authentication password.

The intelligent terminal device 2100 further includes the memory 2104, configured to store a program and the like. Specifically, the program may include program code, where the program code includes a computer operation instruction. The memory 2104 may include a random access memory (RAM), or may further include a non-volatile memory, such as at least one disk memory. The processor 2102 executes the application program stored in the memory 2104, to implement the foregoing method for joining a node to a network.

Figure 22:
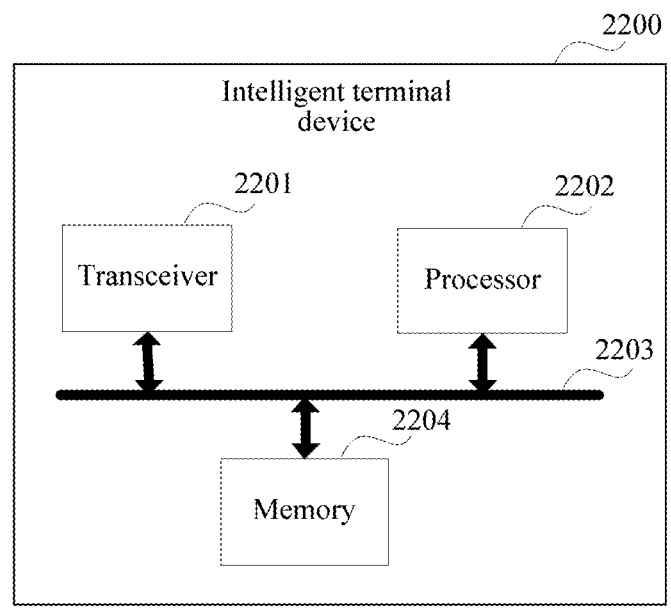
FIG. 22 is a schematic diagram of an intelligent terminal device according to an embodiment of the present invention.

Based on the foregoing embodiments, the present invention further provides an intelligent terminal device 2200. The intelligent terminal device is a DM. Referring to FIG. 22, the intelligent terminal device 2200 includes: a transceiver 2201, a processor 2202, a bus 2203, and a memory 2204.

The transceiver 2201, the processor 2202, and the memory 2204 are connected to each other by using the bus 2203. The bus 2203 may be a peripheral component interconnect (PCI) bus, an extended industry standard architecture (EISA) bus, or the like. The bus may be classified into an address bus, a data bus, a control bus, or the like. For ease of representation, the bus 2203 is represented in FIG. 22 by using only one bold line, but it does not indicate that there is only one bus or only one type of bus.

The transceiver 2201 is configured to communicate with a joined node and a joining node, for example, receiving an access indication sent by the joined node, broadcasting a MAP frame, receiving a registration request sent by the joining node, and sending an authentication password to the joining node.

The processor 2202 is configured to implement the method for joining a node to a network shown in FIG. 10 in the embodiment of the present invention, and the method includes: receiving an access indication sent by a joined node, where the access indication includes information about at least one joining node; separately generating corresponding joining node identification information according to the information about the at least one joining node in the access indication, where the joining node identification information is used to identify each corresponding joining node; broadcasting a MAP frame carrying the generated joining node identification information; receiving a registration request that is sent by a first joining node among a joining node corresponding to the generated joining node identification information, where the registration request is sent by the first joining node when the first joining node determines that the joining node identification information in the MAP frame includes identification information of the first joining node; and determining that a joining node corresponding to the information about the at least one joining node in the access indication includes the first joining node, and sending an authentication password to the first joining node, where the authentication password is used by the first joining node to complete authentication according to the authentication password.

Optionally, the joining node information includes a media access control (MAC) address of the joining node and/or a node identifier of the joining node.

Optionally, the separately generating corresponding joining node identification information according to the information about the at least one joining node in the access indication includes: when the joining node information includes the MAC address of the joining node, separately determining a value corresponding to each bit position in a MAC address of each joining node, selecting a first quantity of bit positions of all bit positions in the MAC address of each joining node according to a specified rule, and generating corresponding joining node identification information according to values corresponding to the first quantity of bit positions selected in the MAC address of each joining node; or when the joining node information includes the node identifier of the joining node, separately determining a MAC address of a corresponding joining node according to each joining node identifier, separately determining a value corresponding to each bit position in the MAC address of each joining node, selecting a first quantity of bit positions of all bit positions in the MAC address of each joining node according to a specified rule, and generating corresponding joining node identification information according to values corresponding to the first quantity of bit positions selected in the MAC address of each joining node.

Optionally, the broadcasting a MAP frame carrying the generated joining node identification information includes: generating a MAP frame including a node auxiliary field, where the node auxiliary field carries the generated joining node identification information; and broadcasting the generated MAP frame.

Optionally, the broadcasting a MAP frame carrying the generated joining node identification information includes: opening a time window for allowing network joining; and broadcasting, at least once in at least one MAC cycle within the time window for allowing network joining, the MAP frame carrying the generated joining node identification information.

Optionally, the sending an authentication password to the first joining node includes: sending a registration confirmation message to the first joining node, where the confirmation message carries the authentication password.

Optionally, after the broadcasting the generated MAP frame, the method further includes: after first preset duration or at completion of authentication of each joining node corresponding to the joining node information in the access indication, generating a MAP frame that does not include the node auxiliary field, and broadcasting the MAP frame that does not include the node auxiliary field, where the first duration is a value of duration during which the MAP frame including the node auxiliary field is broadcast.

Optionally, after the opening a time window for allowing network joining, the method further includes: after second preset duration or upon receiving of a stop access indication sent by the joined node, closing the time window for allowing network joining, where the second duration is a value of duration of the time window for allowing network joining.

The intelligent terminal device 2200 further includes the memory 2204, configured to store a program and the like. Specifically, the program may include program code, where the program code includes a computer operation instruction. The memory 2204 may include a random access memory (RAM), or may further include a non-volatile memory, such as at least one disk memory. The processor 2202 executes the application program stored in the memory 2204, to implement the foregoing method for joining a node to a network.

Figure 23:
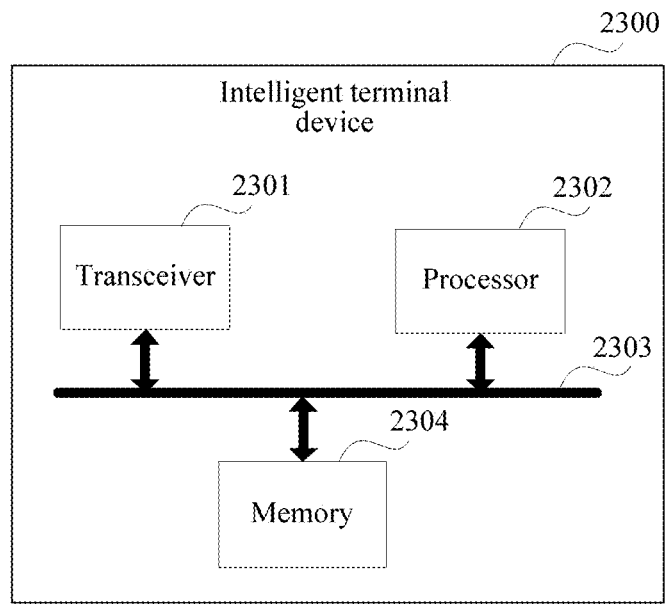
FIG. 23 is a schematic diagram of an intelligent terminal device according to an embodiment of the present invention.

Based on the foregoing embodiments, the present invention further provides an intelligent terminal device 2300. The intelligent terminal device is a joining node. Referring to FIG. 23, the intelligent terminal device 2300 includes: a transceiver 2301, a processor 2302, a bus 2303, and a memory 2304.

The transceiver 2301, the processor 2302, and the memory 2304 are connected to each other by using the bus 2303. The bus 2303 may be a peripheral component interconnect (PCI) bus, an extended industry standard architecture (EISA) bus, or the like. The bus may be classified into an address bus, a data bus, a control bus, or the like. For ease of representation, the bus 2303 is represented in FIG. 23 by using only one bold line, but it does not indicate that there is only one bus or only one type of bus.

The transceiver 2301 is configured to communicate with a DM, for example, receiving a MAP frame sent by the DM, sending a registration request to the DM, and receiving an authentication password returned by the DM.

The processor 2302 is configured to implement the method for joining a node to a network shown in FIG. 11 in the embodiment of the present invention, and the method includes: receiving a MAP frame that is sent by a DM and that carries identification information of at least one joining node; determining identification information used to identify the intelligent terminal device 2300; sending a registration request to the DM when determining that the identification information of the at least one joining node in the MAP frame includes the determined identification information used to identify the intelligent terminal device 2300; receiving an authentication password that is returned by the DM according to the registration request; and completing authentication according to the authentication password.

Optionally, the receiving a media access plan (MAP) frame that is sent by a DM and that carries identification information of at least one joining node includes: receiving a MAP frame forwarded by a MAP relay node, where the MAP frame is sent by the DM and carries the identification information of the at least one joining node.

Optionally, the determining identification information used to identify the intelligent terminal device 2300 includes: determining a value corresponding to each bit position in a MAC address of the intelligent terminal device 2300; selecting a first quantity of bit positions of all bit positions according to a specified rule; and generating, according to values corresponding to the selected first quantity of bit positions, the identification information used to identify the intelligent terminal device 2300.

Optionally, the receiving an authentication password returned by the DM includes: receiving a registration confirmation message that is returned by the DM and that carries the authentication password.

The intelligent terminal device 2300 further includes the memory 2304, configured to store a program and the like. Specifically, the program may include program code, where the program code includes a computer operation instruction. The memory 2304 may include a random access memory (RAM), or may further include a non-volatile memory, such as at least one disk memory. The processor 2302 executes the application program stored in the memory 2304, to implement the foregoing method for joining a node to a network.

Figure 24:
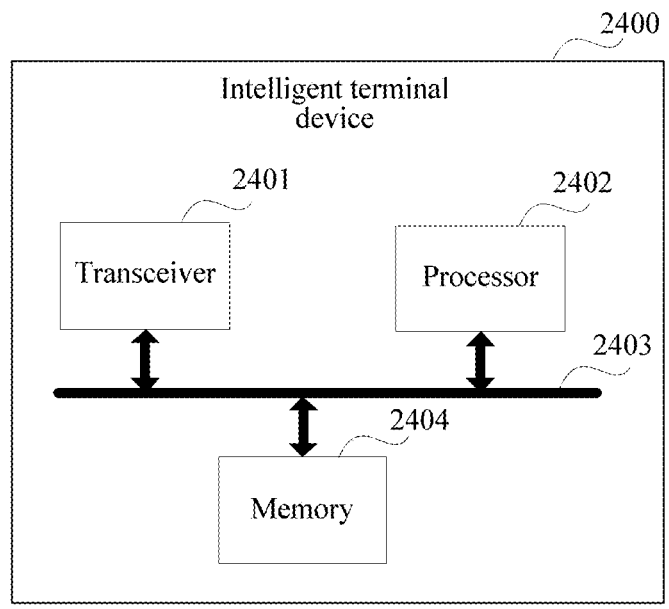
FIG. 24 is a schematic diagram of an intelligent terminal device according to an embodiment of the present invention.

Based on the foregoing embodiments, the present invention further provides an intelligent terminal device 2400. The intelligent terminal device is a DM. Referring to FIG. 24, the intelligent terminal device 2400 includes: a transceiver 2401, a processor 2402, a bus 2403, and a memory 2404.

The transceiver 2401, the processor 2402, and the memory 2404 are connected to each other by using the bus 2403. The bus 2403 may be a peripheral component interconnect (PCI) bus, an extended industry standard architecture (EISA) bus, or the like. The bus may be classified into an address bus, a data bus, a control bus, or the like. For ease of representation, the bus 2403 is represented in FIG. 24 by using only one bold line, but it does not indicate that there is only one bus or only one type of bus.

The transceiver 2401 is configured to communicate with a joined node and a joining node, for example, receiving an access indication sent by the joined node, broadcasting a MAP frame, receiving a registration request sent by the joining node, sending a first joining node information set to the joined node, receiving a second joining node information set sent by the joined node, and sending an authentication password to the joining node.

The processor 2402 is configured to implement the method for joining a node to a network shown in FIG. 13 in the embodiment of the present invention, and the method includes: receiving an access indication sent by a joined node, where the access indication is used to instruct to allow a joining node that does not store an authentication password of a domain in which the intelligent terminal device 2400 is located to join the network; broadcasting a media access plan (MAP) frame according to the access indication, where the MAP frame carries an indication for allowing registration of a node that does not have the authentication password; receiving a registration request that is sent by the joining node that does not store the authentication password of the domain in which the intelligent terminal device 2400 is located; generating a first joining node information set according to joining node information of all joining nodes that have sent a registration request, and sending the first joining node information set to the joined node; receiving a second joining node information set that is returned by the joined node according to the first joining node information set, where the second joining node information set is a subset of the first joining node information set; and sending the authentication password to a joining node corresponding to joining node information in the second joining node information set, where the authentication password is used by the joining node to complete authentication according to the authentication password.

Optionally, the joining node information includes a media access control (MAC) address of the joining node and/or a node identifier of the joining node.

Optionally, the broadcasting, according to the access indication, a MAP frame carrying an indication for allowing registration of a node that does not have the authentication password includes: generating, according to the access indication, a MAP frame to which a specified field is added, where the specified field includes the indication for allowing registration of a node that does not have the authentication password, and the indication for allowing registration of a node that does not have the authentication password is used to instruct a joining node that does not store the authentication password of the domain in which the DM is located to send a registration request; and broadcasting the generated MAP frame.

Optionally, the sending, by broadcasting, according to the access indication, a MAP frame carrying an indication for allowing registration of a node that does not have the authentication password includes: opening a time window for allowing network joining; and broadcasting, at least once in at least one MAC cycle within the time window for allowing network joining, the MAP frame carrying the indication for allowing registration of a node that does not have the authentication password.

Optionally, after the broadcasting the generated MAP frame, the method further includes: after first preset duration, generating a MAP frame to which the specified field is not added, and broadcasting the MAP frame to which the specified field is not added, where the first duration is a value of duration during which the MAP frame to which the specified field is added is broadcast.

Optionally, after the opening a time window for allowing network joining, the method further includes: after second preset duration or upon receiving of a stop access indication sent by the joined node, closing the time window for allowing network joining, where the second duration is a value of duration of the time window for allowing network joining.

The intelligent terminal device 2400 further includes the memory 2404, configured to store a program and the like. Specifically, the program may include program code, where the program code includes a computer operation instruction. The memory 2404 may include a random access memory (RAM), or may further include a non-volatile memory, such as at least one disk memory. The processor 2402 executes the application program stored in the memory 2404, to implement the foregoing method for joining a node to a network.

Figure 25:
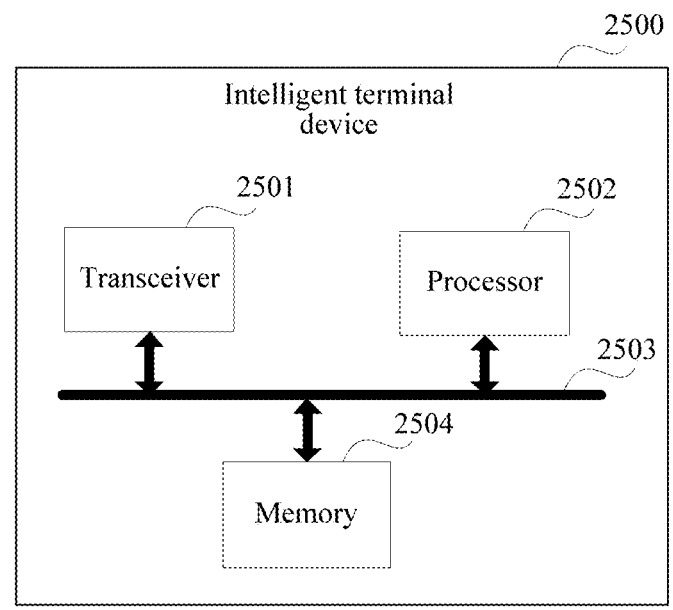
FIG. 25 is a schematic diagram of an intelligent terminal device according to an embodiment of the present invention.

Based on the foregoing embodiments, the present invention further provides an intelligent terminal device 2500. The intelligent terminal device is a joined node. Referring to FIG. 25, the intelligent terminal device 2500 includes: a transceiver 2501, a processor 2502, a bus 2503, and a memory 2504.

The transceiver 2501, the processor 2502, and the memory 2504 are connected to each other by using the bus 2503. The bus 2503 may be a peripheral component interconnect (PCI) bus, an extended industry standard architecture (EISA) bus, or the like. The bus may be classified into an address bus, a data bus, a control bus, or the like. For ease of representation, the bus 2503 is represented in FIG. 25 by using only one bold line, but it does not indicate that there is only one bus or only one type of bus.

The transceiver 2501 is configured to communicate with a DM, for example, sending an access indication to the DM, receiving a first joining node information set sent by the DM, and sending a second joining node information set sent to the DM.

The processor 2502 is configured to implement the method for joining a node to a network shown in FIG. 14 in the embodiment of the present invention, and the method includes: sending an access indication to a DM, where the access indication is used to instruct the DM to allow a node that does not store an authentication password of a domain in which the DM is located to join the network; receiving a first joining node information set that is sent by the DM and that is generated according to joining node information of all joining nodes that have sent a registration request; selecting information about at least one joining node from joining node information of the first joining node information set, and generating a second joining node information set according to the selected information about the at least one joining node; and sending the second joining node information set to the DM.

Optionally, after the sending the second joining node information set to the DM, the method further includes: sending a stop access indication to the DM.

The intelligent terminal device 2500 further includes the memory 2504, configured to store a program and the like. Specifically, the program may include program code, where the program code includes a computer operation instruction. The memory 2504 may include a random access memory (RAM), or may further include a non-volatile memory, such as at least one disk memory. The processor 2502 executes the application program stored in the memory 2504, to implement the foregoing method for joining a node to a network.

Figure 26:
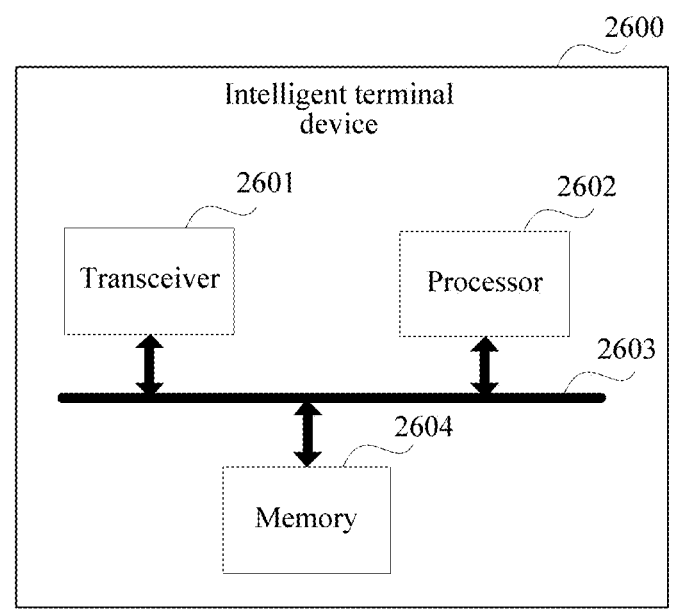
FIG. 26 is a schematic diagram of an intelligent terminal device according to an embodiment of the present invention.

Based on the foregoing embodiments, the present invention further provides an intelligent terminal device 2600. The intelligent terminal device is a joining node. Referring to FIG. 26, the intelligent terminal device 2600 includes: a transceiver 2601, a processor 2602, a bus 2603, and a memory 2604.

The transceiver 2601, the processor 2602, and the memory 2604 are connected to each other by using the bus 2603. The bus 2603 may be a peripheral component interconnect (PCI) bus, an extended industry standard architecture (EISA) bus, or the like. The bus may be classified into an address bus, a data bus, a control bus, or the like. For ease of representation, the bus 2603 is represented in FIG. 26 by using only one bold line, but it does not indicate that there is only one bus or only one type of bus.

The transceiver 2601 is configured to communicate with a DM, for example, receiving a MAP frame sent by the DM, sending a registration request to the DM, and receiving an authentication password returned by the DM.

The processor 2602 is configured to implement the method for joining a node to a network shown in FIG. 15 in the embodiment of the present invention, and the method includes: receiving a media access plan (MAP) frame that is sent by a DM and that carries an indication for allowing registration of a node that does not have an authentication password; sending a registration request to the DM when determining that the intelligent terminal device 2600 does not store the authentication password of a domain in which the DM is located; receiving the authentication password that is returned by the DM according to the registration request; and completing authentication according to the authentication password.

Optionally, the receiving a MAP frame that is sent by a DM and that carries an indication for allowing registration of a node that does not have an authentication password includes: receiving a MAP frame forwarded by a MAP relay node, where the MAP frame is sent by the DM and carries the indication for allowing registration of a node that does not have the authentication password.

The intelligent terminal device 2600 further includes the memory 2604, configured to store a program and the like. Specifically, the program may include program code, where the program code includes a computer operation instruction. The memory 2604 may include a random access memory (RAM), or may further include a non-volatile memory, such as at least one disk memory. The processor 2602 executes the application program stored in the memory 2604, to implement the foregoing method for joining a node to a network.

In conclusion, according to the method, the apparatus, and the system for joining a node to a network provided in the embodiments of the present invention, after receiving an access indication that is sent by a joined node and that carries information about at least one joining node, a DM sends, by broadcasting, according to the access indication, a MAP frame carrying the information about the at least one joining node, so that a joining node corresponding to the joining node information directly completes registration after receiving the MAP frame; and the DM sends an authentication password to the joining node, so that the joining node completes authentication according to the authentication password and therefore successfully joins the network. In this way, when receiving information about a specified joining node, the DM can allow the specified joining node to complete registration and authentication and therefore successfully join the network. Obviously, the DM can allow multiple joining nodes to join the network at the same time, thereby improving network joining efficiency of the nodes, increasing a network joining success rate, and improving user experience and security.

Persons skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, persons skilled in the art can make various modifications and variations to the embodiments of the present invention without departing from the spirit and scope of the embodiments of the present invention. The present invention is intended to cover these modifications and variations provided that they fall within the scope of protection defined by the following claims and their equivalent technologies.

What is claimed is:

1. An apparatus, comprising:
 a receiver, configured to receive an access indication from a joined node, wherein the access indication comprises information about a joining node; and
 a transmitter, configured to broadcast a media access plan (MAP) frame according to the access indication, wherein the MAP frame carries the information about the joining node;
 wherein the receiver is further configured to receive a registration request from the joining node when the information about the joining node in the MAP frame comprises node information of the joining node; and
 wherein the transmitter is further configured to send an authentication password to the joining node, wherein the authentication password is used to complete authentication according to the authentication password.

2. The apparatus according to claim 1, wherein the information about the joining node comprises a media access control (MAC) address of the joining node, a node identifier of the joining node, or both the MAC address of the joining node and the node identifier of the joining node.

3. The apparatus according to claim 1, wherein the transmitter is configured to:
 obtain the information about the joining node carried in the access indication;
 generate the MAP frame, wherein the MAP frame comprises a node auxiliary field, and the node auxiliary field carries the information about the joining node; and
 broadcast the generated MAP frame.

4. The apparatus according to claim 3, wherein the transmitter is further configured to:
 after the generated MAP frame is broadcast, and after a first preset duration, or at completion of authentication of each joining node corresponding to the information about the joining node carried in the node auxiliary field of the MAP frame, generate another MAP frame that does not comprise the node auxiliary field, and broadcast the another MAP frame that does not comprise the node auxiliary field; and
 wherein the first preset duration is a value of a duration during which the MAP frame comprising the node auxiliary field is broadcast.

5. The apparatus according to claim 1, wherein the transmitter is configured to:
 open a time window for allowing network joining; and
 broadcast, in a media access control (MAC) cycle within the time window for allowing network joining, the MAP frame carrying the information about the joining node.

6. The apparatus according to claim 1, wherein the transmitter is configured to:
 send a registration confirmation message to the joining node, wherein the confirmation message carries the authentication password.

7. An apparatus, comprising:
 a processor; and
 a non-transitory computer-readable storage medium storing a program to be executed by the processor;
 a receiver, configured to receive a media access plan (MAP) frame from a domain master controller (DM) that carries information about a joining node; and a transmitter, configured to send a registration request to the DM when the information about the joining node in the MAP frame comprises node information of the apparatus;

wherein the receiver is further configured to receive an authentication password that is returned by the DM according to the registration request; and wherein the non-transitory computer-readable storage medium comprises instructions that, when executed by the processor, instruct the processor to complete authentication according to the authentication password.

8. The apparatus according to claim 7, wherein the information about the joining node comprises a media access control (MAC) address of the joining node, a node identifier of the joining node, or both the MAC address of the joining node and the node identifier of the joining node.

9. The apparatus according to claim 7, wherein the receiver is configured to:
receive a registration confirmation message that is returned by the DM and that carries the authentication password.

10. A non-transitory computer-readable storage medium comprising instructions which, when executed by a computer, cause the computer to:
receive an access indication from a joined node, wherein the access indication comprises information about a joining node;
generate joining node identification information corresponding to the joining node according to the information about the joining node in the access indication, wherein the joining node identification information identifies the joining node;
broadcast a media access plan (MAP) frame carrying the generated joining node identification information;
receive a registration request from the joining node when the joining node identification information in the MAP frame comprises identification information of the joining node; and
send an authentication password to the joining node, wherein the authentication password is used to complete authentication according to the authentication password.

11. The non-transitory computer-readable storage medium according to claim 10, wherein the information about the joining node comprises a media access control (MAC) address of the joining node, a node identifier of the joining node, or both the MAC address of the joining node and the node identifier of the joining node.

12. The non-transitory computer-readable storage medium according to claim 11, wherein generating the joining node identification information corresponding to the joining node according to the information about the joining node in the access indication comprises:
when the information about the joining node comprises the MAC address of the joining node, determining a value corresponding to each bit position in a MAC address of the joining node, selecting a first quantity of bit positions of all bit positions in the MAC address of the joining node according to a specified rule, and generating corresponding joining node identification information according to values corresponding to the first quantity of bit positions selected in the MAC address of the joining node; or
when the information about the joining node comprises the node identifier of the joining node, determining the MAC address of the joining node according to the node identifier of the joining node, determining a value corresponding to each bit position in the MAC address of the joining node, selecting a first quantity of bit positions of all bit positions in the MAC address of the joining node according to a specified rule, and generating corresponding joining node identification information according to values corresponding to the first quantity of bit positions selected in the MAC address of the joining node.

13. The non-transitory computer-readable storage medium according to claim 10, wherein the instructions, when executed by the computer, cause the computer to:
generate the MAP frame, wherein the MAP frame comprises a node auxiliary field, and the node auxiliary field carries the generated joining node identification information; and
broadcast the generated MAP frame.

14. The non-transitory computer-readable storage medium according to claim 13, wherein the instructions, when executed by the computer, cause the computer to:
after the generated MAP frame is broadcast, and after a first preset duration, or at completion of authentication of the joining node, generate another MAP frame that does not comprise the node auxiliary field, and broadcast the another MAP frame that does not comprise the node auxiliary field;
wherein the first preset duration is a value of a duration during which the MAP frame comprising the node auxiliary field is broadcast.

15. The non-transitory computer-readable storage medium according to claim 10, wherein the instructions, when executed by the computer, cause the computer to:
open a time window for allowing network joining; and
broadcast, in a media access control (MAC) cycle within the time window for allowing network joining, the MAP frame carrying the generated joining node identification information.

16. The non-transitory computer-readable storage medium according to claim 10, wherein the instructions, when executed by the computer, cause the computer to:
send a registration confirmation message to the joining node, wherein the confirmation message carries the authentication password.

17. A non-transitory computer-readable storage medium comprising instructions which, when executed by a computer, cause the computer to:
receive a media access plan (MAP) frame from a domain master controller (DM) that carries identification information of a joining node;
send a registration request to the DM when the identification information of the joining node in the MAP frame comprises the determined identification information identifying the computer for joining a node to a network;
receive an authentication password from the DM in response to the registration request; and
complete authentication according to the authentication password.

18. The non-transitory computer-readable storage medium according to claim 17, wherein the instructions, when executed by the computer, cause the computer to:
determine a value corresponding to each bit position in a media access control (MAC) address of the computer;
select a first quantity of bit positions of all bit positions according to a specified rule; and generate, according to values corresponding to the selected first quantity of bit positions, the identification information identifying the computer to a network.

19. The non-transitory computer-readable storage medium according to claim 17, wherein the instructions, when executed by the computer, cause the computer to:
receive a registration confirmation message carrying the authentication password from the DM.

* * * * *